US 6,695,294 B2

(12) United States Patent
Miller et al.

(10) Patent No.: US 6,695,294 B2
(45) Date of Patent: Feb. 24, 2004

(54) CONTROLLED EQUILIBRIUM DEVICE WITH DISPLACEMENT DEPENDENT SPRING RATES AND INTEGRAL DAMPING

(75) Inventors: Lane R. Miller, Fuquay-Varina, NC (US); Douglas A. Swanson, Apex, NC (US); Russell E. Alteri, Cary, NC (US); Douglas E. Ivers, Cary, NC (US); Stephen F. Hildebrand, Apex, NC (US); William S. Jensen, Apex, NC (US); Scott K. Miller, Raleigh, NC (US); Michael D. Janowski, Clayton, NC (US); Michael F. Walch, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/910,386

(22) Filed: Jul. 20, 2001

(65) Prior Publication Data

US 2003/0015830 A1 Jan. 23, 2003

(51) Int. Cl.[7] .................................................. F16F 5/00
(52) U.S. Cl. .............................. 267/64.16; 188/322.18
(58) Field of Search ......................... 188/266.2, 266.5, 188/271, 282.3, 286, 322.18, 322.22; 267/189, 219, 64.11, 64.16, 64.19, 64.23, 64.26, 64.27, 64.28

(56) References Cited

U.S. PATENT DOCUMENTS

| | | | |
|---|---|---|---|
| 2,322,879 A | 6/1943 | Piron | 287/33 |
| 2,493,026 A | 1/1950 | Pointer | 280/104.5 |
| 3,074,709 A | 1/1963 | Ballard et al. | 267/65 |
| 3,130,694 A | 4/1964 | Johnson | 267/1 |
| 3,258,134 A | 6/1966 | Nicolas | 213/221 |
| 3,762,694 A | 10/1973 | MacDonnell | 267/3 |
| 3,790,147 A | 2/1974 | Owen | 267/65 B |
| 4,424,961 A | 1/1984 | Takei | 267/64.27 |
| 4,445,673 A | * 5/1984 | Clark | 267/64.24 |
| 4,588,171 A | 5/1986 | Stephens | 267/64.24 |
| 4,595,167 A | 6/1986 | Tangorra et al. | 248/638 |
| 4,614,333 A | 9/1986 | Gaylord | 267/61 S |
| 4,722,548 A | * 2/1988 | Hamilton et al. | 267/64.15 |
| 4,725,046 A | 2/1988 | Sugino | 267/140.1 |
| 4,844,428 A | * 7/1989 | Margolis et al. | 267/64.21 |
| 4,851,849 A | * 7/1989 | Albersdoerfer | 342/43 |
| 4,877,223 A | * 10/1989 | Hackett | 267/64.17 |
| 4,934,667 A | * 6/1990 | Pees et al. | 267/64.21 |
| 5,058,868 A | * 10/1991 | Sirven | 267/259 |

(List continued on next page.)

FOREIGN PATENT DOCUMENTS

| | | |
|---|---|---|
| EP | 0 670 231 A2 | 2/1995 |
| EP | 0 800 939 A1 | 4/1997 |
| FR | 1.265.799 | 6/1961 |
| GB | 2 298 021 B | 2/1997 |

*Primary Examiner*—Jack Lavinder
*Assistant Examiner*—Xuan Lan Nguyen
(74) *Attorney, Agent, or Firm*—Edward F. Murphy, III

(57) ABSTRACT

A controlled equilibrium device comprising a housing; at least one spring, each at least one spring having a spring stiffness; and a load leveling device movable through the housing between a first maximum displacement position and a second maximum displacement position, the load leveling device comprising a deadband displacement zone defined between a first deadband displacement threshold and a second deadband displacement threshold, the displacement required to reach the first and second deadband displacement thresholds being less than the displacement distances required to reach the first and second maximum displacement positions, the at least one spring stiffness being substantially constant when the displacement of the load leveling device is within the deadband zone, the stiffness of the at least one spring being modified to a second stiffness when the load leveling device is equal to or beyond either the first deadband displacement threshold or the second deadband displacement threshold.

17 Claims, 23 Drawing Sheets

U.S. PATENT DOCUMENTS

| | | | |
|---|---|---|---|
| 5,257,680 A | * 11/1993 | Corcoran et al. | 188/129 |
| 5,276,622 A | * 1/1994 | Miller et al. | 701/37 |
| 5,456,341 A | 10/1995 | Garnjost et al. | 188/378 |
| 5,526,292 A | 6/1996 | Hodgson et al. | 364/574 |
| 5,794,909 A | 8/1998 | Platus et al. | 248/550 |
| 5,845,236 A | 12/1998 | Jolly et al. | 702/195 |
| 6,454,061 B1 | * 9/2002 | Antonovsky | 188/280 |

* cited by examiner

CONTROLLED EQUILIBRIUM DEVICE WITH DISPLACEMENT DEPENDENT SPRING RATES AND INTEGRAL DAMPING

FIELD OF THE INVENTION

The invention relates to a controlled equilibrium device, and more specifically the invention relates to a controlled equilibrium device that provides active relative position control between first and second members where the controlled equilibrium device comprises a first spring rate applied when the device is below a threshold displacement value, a second spring rate applied when the device is above a threshold displacement value and integral damping for controlling the device displacement.

BACKGROUND OF THE INVENTION

Conventional passive isolators and mounts include elastomeric or other resilient members producing a support stiffness that limits, for a particular environment or application, the transmission of vibratory disturbances and displacements across the isolator. If the input excitation frequencies are well above the suspension resonance, then good isolation can be achieved without undue difficulty. However, often there are also large inputs with frequencies near the suspension resonance, which amplifies the excitation. There may be insufficient damping in the conventional passive isolators to control motion at resonance. In such case, the well known isolators with resilient members typically comprise a trade-off between low or "soft" spring rates suitable for effectively limiting the transmission of high frequency vibratory inputs, and high or "hard" spring rates suitable for limiting the relative motion across the isolator caused by low frequency inputs. If the spring rate is too hard, excessive high frequency vibration will be transmitted. If the spring rate is too soft, low frequency inputs will produce excessive strain in the resilient members causing durability problems. In addition, if the spring rate is too soft, low frequency inputs will produce damaging collisions between the suspended device and adjacent devices, due to the large relative displacements. Conventional passive isolators may incorporate progressive stiffness such that the mounts snub near end-of-travel for large, low-frequency input excitations. This is only a slight improvement, since isolation will be degraded for all times at the higher stiffness, and contacting the snubbers typically results in a jolt with resulting decreased passenger comfort or reduced life for suspended components. For the soft spring rate, conventional passive isolators must accommodate a large static deflection, which causes increased size, weight and cost, which are undesirable. If the static load size and location varies, the resulting static deflection also varies, which increases difficulty for connecting to adjacent unsuspended devices and precludes maintaining a level platform which reduces passenger comfort such as in truck cabs.

The above risk of excessive strain in the resilient member may be decreased by increasing the size of the rubber elements, thereby not increasing the strain even as the displacement is increased. However, the increased size will result in greater size, weight and cost, which are undesirable. The above risk of damaging collisions may be decreased by utilizing increased damping, particularly at resonance. However, elastomers typically have low damping values, and those with high damping have reduced durability and higher compression set, which in turn increases the static deflection which is undesirable as discussed above. Adding external damping, for example hydraulic shock absorbers, may help but at increased complexity and cost. Even if the size of the rubber elements and damping could be increased without added size, weight and cost, the resulting system would still have the aforementioned difficulties with snubbing and load leveling.

An alternative to the conventional passive isolator is the conventional passive air-suspension with separate load-leveling valve and hydraulic damper. The air-suspension provides a soft suspension for good isolation of high frequency inputs. The load leveling valve limits the static deflection thereby reducing strain in the suspension. This system effectively provides a high spring rate at very low, quasi-static response frequencies, and a soft spring rate at all other frequencies. The load leveling for a conventional passive air-suspension typically includes a "dead band" wherein the valve is not actuated for high frequency, low amplitude vibrations, thereby minimizing power consumption. The hydraulic damper allows greater damping than the conventional passive isolator and thus limits motion near resonance. However, hydraulic dampers are velocity-sensitive devices, and thus provide no damping at very low, quasi-static response frequencies. Thus the conventional passive air-suspension with separate load-leveling valve and hydraulic damper are particularly ill-suited for applications wherein high damping at very low frequency, quasi-static roll and pitch are important for driver comfort and perceived safety, such as in a four-point-soft cab suspensions. In addition, the load leveling provided by a conventional passive air-suspension responds too slowly to react to anything but quasi-static inputs. Thus, the load leveling provided by a conventional passive air-suspension cannot reduce the time spent near end of travel at the snubbers with resulting reduced performance as discussed above. If the reciprocal of the response time is the "break frequency", then the "break frequency" must be less than the resonance frequency to maintain stability. For this system, adding damping allows a faster stable response time. By carefully tuning and controlling damping, the response time can be optimized and controlled in a stable manner, thereby providing "fast load leveling". Fast load leveling further improves the vibration isolation, since it optimally reduces the amount of time near the "end of travel" where the high stiffness of the snubbing reduces the isolation. However, the hydraulic dampers used in a conventional passive air-suspension are not easily controlled since they are sensitive to temperature and prone to leakage. It is therefore desirable to integrate the air-suspension and leveling valve into a single device with carefully tuned, well controlled damping. In addition, integrating the air-suspension, load-leveling valve and damping into a single device reduces system complexity, eliminates device support bracketry and thereby reduces system size, weight and cost.

Another means for canceling noise and vibration across a broadband of frequencies is through the use of active mounts such as those described in U.S. Pat. Nos. 5,526,2292 and 5,845,236 both assigned to Lord Corporation. Such active devices use actuators to cancel the force that is transmitted through the mount. In effect, active mounts are very soft at relatively high vibration frequencies and reasonably stiff at low frequencies to control relative motion. Active mounts provide suitable vibration control however active mounts are quite expensive and conventional active mounts and systems require complex electronic control systems and methods.

Control equilibrium devices or CEM's are typically soft mounts that include a load leveling feature which makes the mount stiffer at low frequencies and soft at high frequencies.

One such CEM is disclosed in United Kingdom Patent Number 2,298,021 for "Improved Vibration Isolator" issued and assigned to Barry Controls Limited. As shown in the FIGS. 2 and 4 of the '021 reference, the vibration isolator generally comprises a core assembly movably suspended within a housing by a resilient member and a valve arrangement such that when the core assembly reaches a predetermined point of deflection, the valve arrangement causes fluid to flow into the core to apply a force tending to return the core assembly to the equilibrium position.

In the '021 reference the core assembly translates freely through the housing until it contacts or is snubbed by the housing. No damping is provided except the low-level damping in the elastomeric members, which as discussed above for conventional passive isolators, may be insufficient to control motion at resonance. Thus, when the device is excited at resonance, the core unit will experience large amplitude displacements and likely will snub out a number of times. The snubbing is undesirable and may decrease passenger comfort, decrease the life of the mounted device, and limit the effective useful life of the mount. It would be desirable to provide damping to the movable core assembly to control the assembly displacement and further limit snubbing contact between mount component parts during resonance and other frequencies at or near resonance. Damping may also be desirable for stability and speed of response.

The foregoing illustrates limitations known to exist in present rubber mounts. Thus, it is apparent that it would be advantageous to provide an alternative controlled equilibrium mount directed to overcoming the limitations set forth above. Accordingly, a suitable alternative mount is provided including features more fully disclosed hereinafter.

SUMMARY OF THE INVENTION

In one aspect of the present invention this is accomplished by providing a controlled equilibrium mount or suspension device that provides displacement dependent spring rates, active relative position control and load leveling during resonance and during low frequency high amplitude inputs. The mount of the present invention also provides integral damping during mount displacement. The suspension device, comprises: a housing comprising a wall that defines a housing chamber, the housing wall comprising an integral valve including an inlet for supplying displacement means to the chamber and a discharge port for discharging the displacement means from the chamber; at least one spring, each at least one spring having a spring stiffness; and a load leveling device supported by one of at least one spring, the load leveling device comprising a member movable through the housing chamber by the displacement means, the load leveling device comprising a first deadband displacement zone defined between the inlet and a portion of the movable member and a second deadband displacement zone defined between the discharge port and a second portion of the movable member, the movable member being at a nominal position when the movable member displacement is within the deadband zones, the integral valve being closed to the supply and discharge of displacement means when the movable member is in the nominal position; and wherein when the movable member is displaced out of either deadband zone the integral valve is open to provide the required change in displacement means to return the movable member to the nominal position.

Integral damping is provided to control the displacement of a movable mass such as a truck cab. The integral damping may be comprised of surface effect damping. The mount may include a movable piston member movable through the mount housing. The desired surface effect damping is provided as at least three protuberances along the outer surface of the piston sealingly and frictionally engage a resilient layer of material along the housing chamber wall during relative displacement of the piston and resilient layer.

The load leveling device is generally comprised of means for sensing displacement of a movable member. If the movable member of the device has experienced displacement that exceeds the deadband range as disclosed in the preferred embodiments of the invention, the sensing means provides a signal either electrically by an electrically actuated device such as a switch or sensor or mechanically by as a valve to indicate such displacement. The load leveling device also comprises a controller for controlling the return displacement of the mount in order to ensure that the mount is returned to its desired nominal orientation. The controller may be comprised of an electrically or mechanically actuated device. Finally the load leveling device comprises a displacement source for returning the mount to its nominal configuration and such source may comprise a motor, air, hydraulic fluid or a thermally expandable phase change material such as wax. Depending on the applied loads and mount design, the displacement device may be comprised solely of air or hydraulic fluid or may be comprised of such in combination with a discrete spring member $K_c$ such as a mechanical spring or an elastomer member. The movable load leveling member may be comprised of a piston, shaft or a movable plate. As will be described hereinafter, when the mount experiences large, low frequency loads, the movable member typically travels through the deadband zone and the load leveling device serves to return the mount to its nominal orientation.

The suspension device of the present invention has a spring rate that is greater during periods where low frequency high amplitude vibrations are applied to the device than during periods where high frequency low amplitude vibrations are applied to the device.

The present invention may be used in a variety of applications including but not limited to supporting a passenger cab for a truck, a vehicle engine, a wing mounted aircraft engine, a fuselage mounted aircraft engine or a pylon in a helicopter rotor.

In summary, the device of the present invention provides vibration control characteristics of a soft mount with effective motion control; provides broadband, high frequency control, has the potential for a longer useful life than conventional rubber mounts, provides improved isolation and also provides active relative position control and load leveling features.

The foregoing and other aspects will become apparent from the following detailed description of the invention when considered in conjunction with the accompanying drawing figures.

DETAILED DESCRIPTION OF THE PREFERRED EMBODIMENTS

Figure 1:
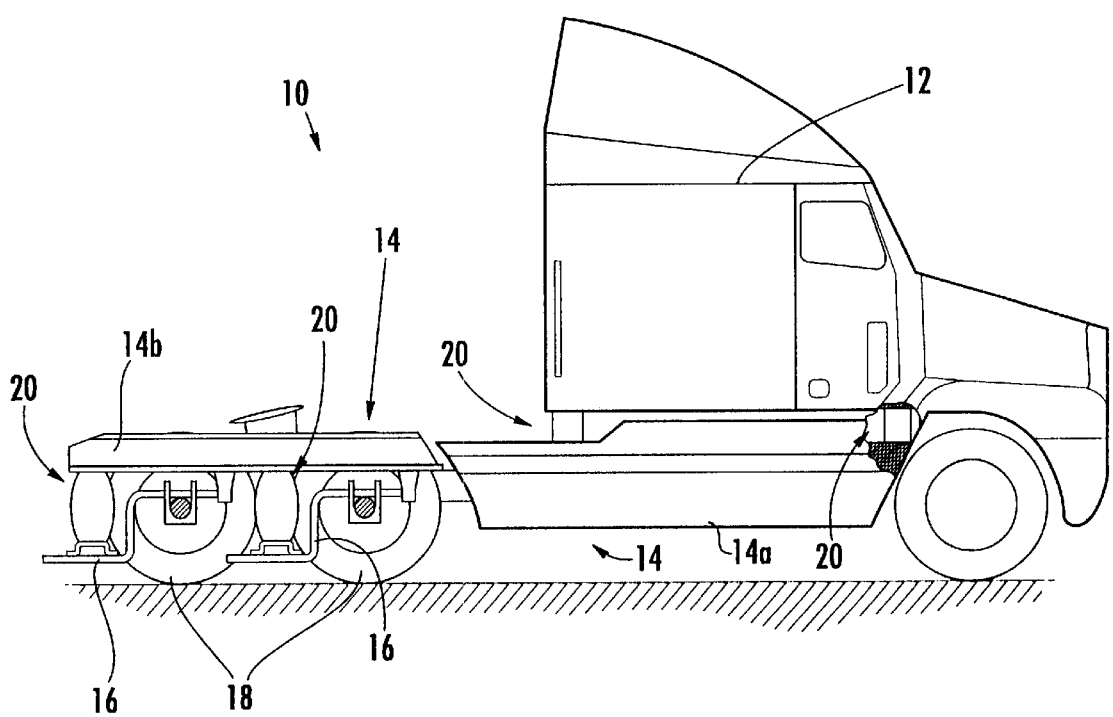
FIG. 1 is a schematic representation of a land vehicle that includes the suspension device of the present invention.

Now turning to the drawing figures wherein like parts are referred to by the same numbers in the several views, FIG. 1 illustrates a land vehicle 10 that includes a number of suspension devices or mounts 20 of the present invention. As shown in FIG. 1, the land vehicle is a conventional truck for pulling a cargo trailer (not shown). Vehicle 10 includes cab 12 that is supported by vehicle frame 14 with front and rear frame portions 14a and 14b respectively. The rear portion 14b of the frame 14 is supported by suspension members 16 that connect the rear portion of frame 14 and the axles of rear wheels 18. Suspension devices 20 are located between the cab 12 and front portion of frame 14a and also between the rear frame 14b and suspension members 16. Although two mounts are shown between the cab 12 and frame 14a and between the suspension 16 and frame 14b, it should be understood that additional mounts 20 not specifically shown in schematic FIG. 1 are also provided to support the cab 12 and suspension 16 relative to the frame 14. For example, for the truck 10 of FIG. 1, mounts 20 are provided at each corner of the square or rectangular cab between the frame 14a and the cab, and the vehicle 10 includes additional suspension members 16 at opposite rear wheels 18 (both not shown) with mounts located between the additional suspension members and the frame 14b.

For clarity, as the description proceeds the present invention may be referred to as a "mount", an "isolator", a "suspension device", a "controlled equilibrium mount", "a controlled equilibrium device" or simply by the abbreviation "CEM". The mount of the present invention may be used to limit the transmission of vibration in a variety of applications including, but not limited to, truck cabs, seats, primary truck suspensions, internal combustion engines, fuselage mounted aircraft engines, wing mounted aircraft engines and helicopter pylons.

Figure 2:
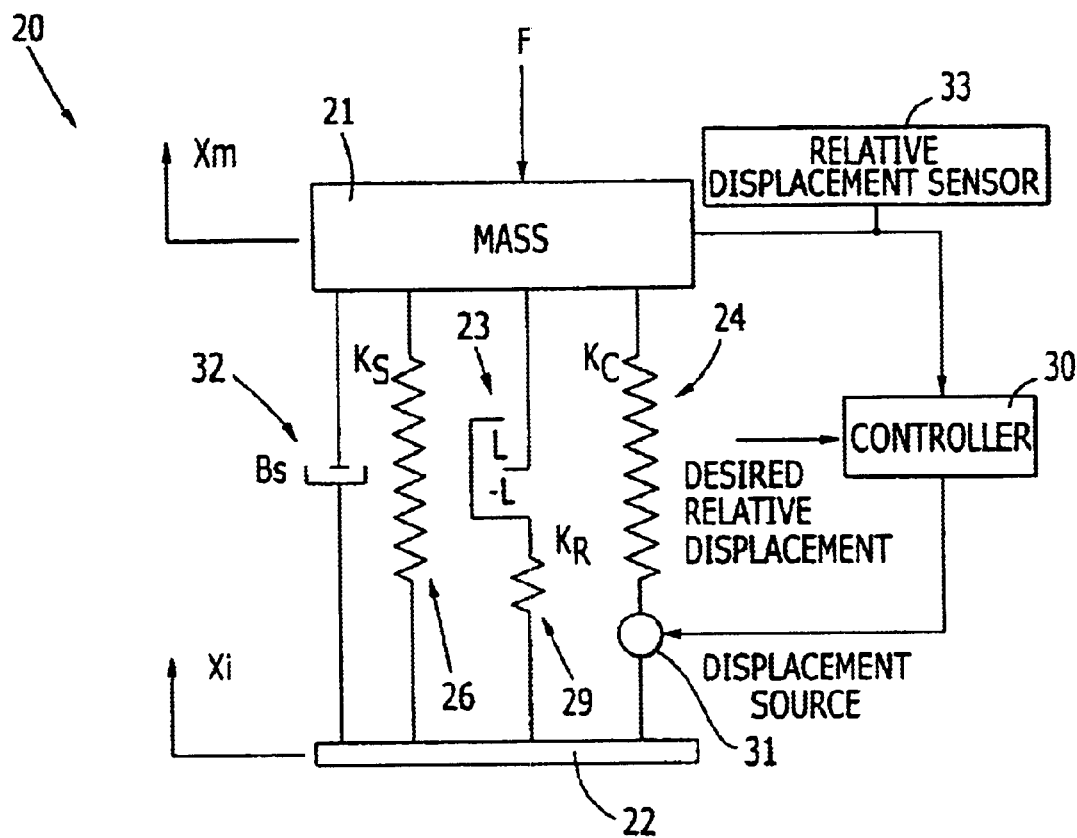
FIG. 2 is a schematic representation of the suspension device of the present invention.
Figure 3:
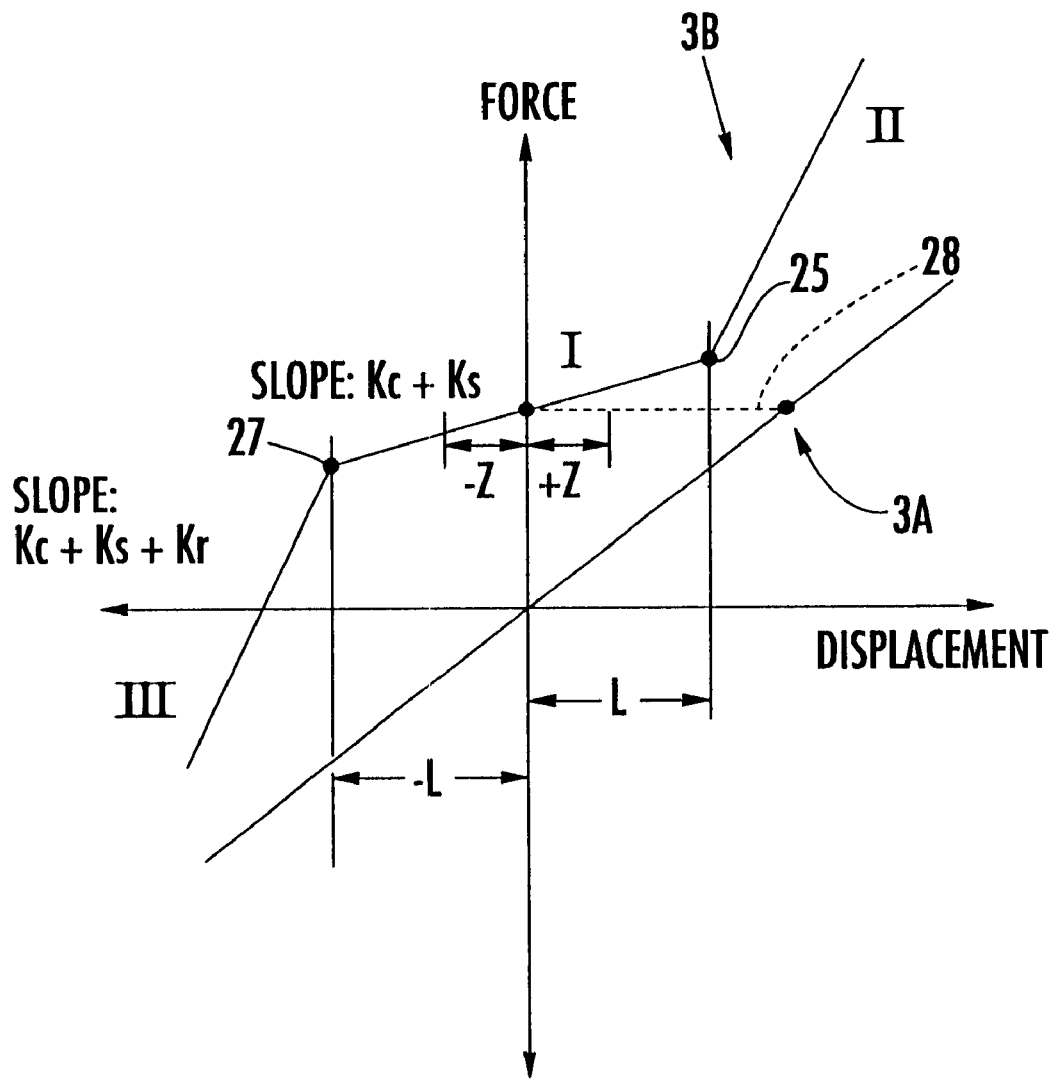
FIG. 3 includes comparative characteristic performance curves of Force versus Displacement for the suspension device of the present invention and also for a conventional passive mount.
Figure 4:
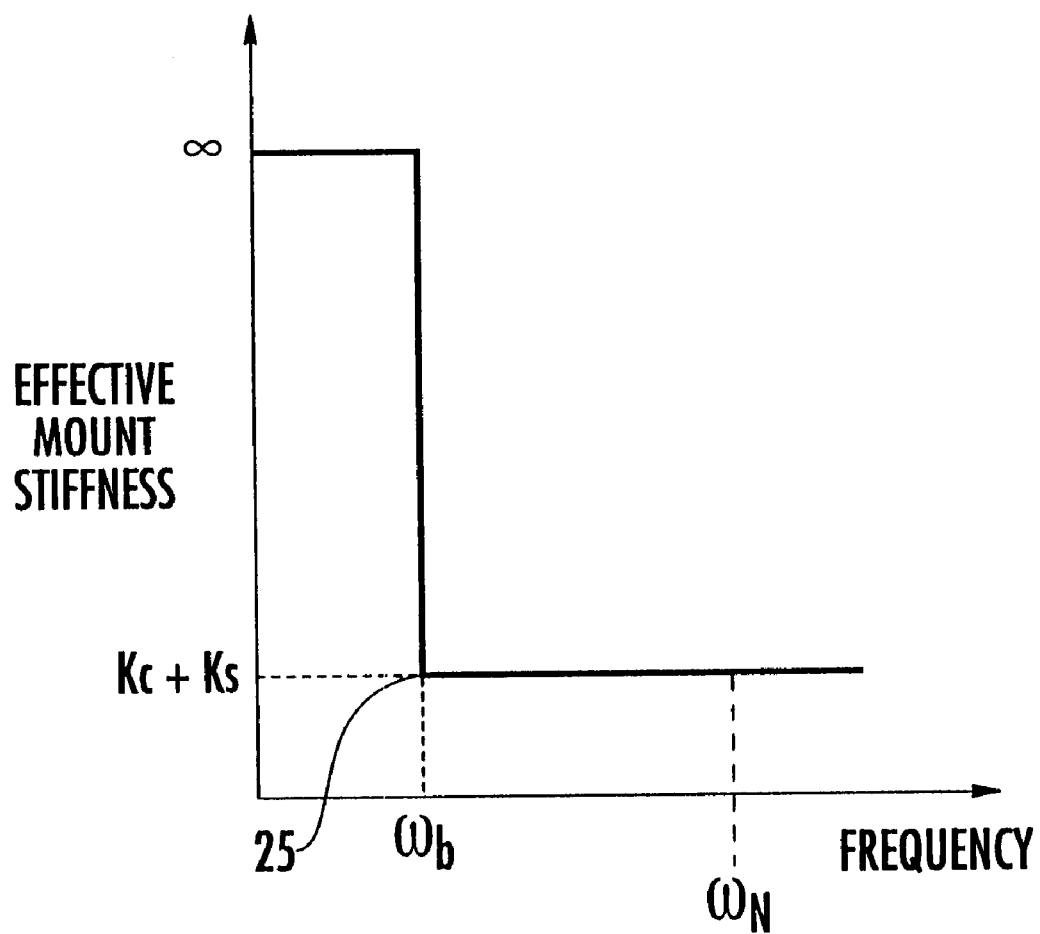
FIG. 4 is a characteristic performance curve of Effective Mount Stiffness versus Frequency for the suspension device of the present invention.

FIG. 2 is a schematic representation of the suspension device 20, and FIG. 3 and FIG. 4 are characteristic performance curves for mount 20 of FIG. 2. Note that for ease of illustration, FIG. 3 is a representative curve of the vibratory quasi-static Force versus Displacement for the mount of the present invention without damping 32. FIG. 4 is a curve that is representative of Effective Mount Stiffness versus Frequency for the mount of the present invention.

FIG. 3 includes curves identified as 3A and 3B. Curve 3A represents the performance of a conventional passive resilient mount that includes a conventional linearly acting spring, and curve 3B is a representative plot of the performance of the CEM of the present invention without considering the effects of damping 32 and with snubbing. The slope of curve 3B, represents the variable stiffness of the CEM 20, that is dependent on the displacement of the mount. As will be described in greater detail hereinbelow, the mount stiffness may change slightly when the mount exceeds an equilibrium region known as the deadband region and illustrated graphically between –Z and +Z in FIG. 3. The mount stiffness remains substantially constant when the mount displacement is within the deadband zone and immediately beyond the zone. If the displacement exceeds the deadband zone and reaches either the upper or lower limits of displacement, the stiffness will increase significantly. The displacement limits are identified as points 25 and 27 in FIG. 3. Ultimately for extreme load conditions the mount may encounter the sway space limits between –L and +L in FIG. 3B. The dimension of the sway space displacement or displacement limit is typically larger than the dimension of the deadband displacement zone. However for some mount applications, the sway space and deadband zone may have the same dimensions. Resilient snubbing is provided when the mount is displaced an amount equal to the sway space dimensions.

The slope of curve 3A, representing the stiffness of a linearly acting spring, is constant as the mount is displaced. The mount 20 having a variable stiffness provides the required increase in stiffness when the system experiences low frequency high amplitude displacement. Using dashed font reference line 28 on FIG. 3 to emphasize a difference between the devices represented by curves 3A and 3B, for a given force value within a normal mount operating zone, the displacement of the conventional passive device 3A is much greater than the displacement of the CEM of the present invention.

Returning to FIG. 2, the mount 20 includes movable mass 21 such as a truck cab, that is displaced by a vibration input identified as F in FIG. 2 and a base or frame 22 that is displaced by a vibration input identified as $X_i$ in FIG. 2. The mount 20 of the present invention actively controls the relative displacement defined as $X_m$–$X_i$ between the mass and frame. The resultant mass displacement, $X_m$ is a result of the input displacement $X_i$; the load, F and the damping properties of the mount. A load identified as F in FIG. 2, which may be a transient load, a static load or vibratory input, is applied to the mass and causes the mass to be displaced a distance $X_m$. The force may be a force due to gravity experienced during vehicle braking or may be produced by movement of the driver in the seat. As the description proceeds, the load F may be referred to as "the transient load", the low frequency "load", or "the load". The mount 20 provides a relatively soft spring rate when the CEM is displaced within the deadband range, and the stiffness increases as the displacement exceeds the deadband range through the sway space. As used in FIGS. 2 and 3, the values –Z and –L refer to mount compression and the values +Z and +L refer to mount extension.

As shown graphically in FIG. 3, when the mount is displaced through the deadband zone and sway space, the spring rate of the mount is equal to the sum of the slope of springs 24 and 26 that are in parallel. Springs 24 and 26 are also respectively identified as Kc and Ks so that the slope is equal to Kc+Ks. Collectively the springs 24 and 26 may be referred to as a first spring with a stiffness equal to Kc+Ks. This section of curve 3B is represented by number I in FIG. 3. Although two springs 24 and 26 are shown in FIG. 2 it should be understood that the device 20 may only include one spring Kc or Ks or may include more than two springs and the springs may be in parallel or in series.

Beyond either the displacement values of L or –L, at respective points 25 and 27 on FIG. 3, a spring rate higher than Kc+Ks is supplied by the mount 20. This higher spring rate may also be referred to as snubbing by those skilled in the art. The displacement may exceed the sway space limits at resonance or when the system experiences a high amplitude vibration input at the mass 21. When the mount displacement exceeds either of the sway space limits, the applied spring stiffness is increased to a value equal to the sum Ks+Kc+Kr where Kr is a second spring 29 in series with first spring (Kc+Ks) and coupled to coupling 23. The sections of increased stiffness are identified on plot 3B by numbers II and III.

The mount of the present invention comprises a load leveling device 30 shown schematically in FIG. 2. As shown in FIG. 2, the load leveling device 30 is generally comprised of sensing means 33 for determining if a movable member such as a piston or plate has experienced displacement that exceeds a predetermined range such as the deadband range for example. As disclosed in the preferred embodiments of the invention the sensing means may comprise an electrically actuated device such as a switch or sensor for example or may comprise a mechanically actuated device such as a valve. The load leveling device also comprises a controller 32 for controlling the return displacement of the mount in order to ensure that the mount is returned to its desired nominal orientation. The controller may be comprised of an electrically actuated controller or a valve that is closed when the mount is at the nominal position. Finally the load leveling device comprises a displacement source for supplying a force to return the mount to its nominal configuration and displacement such source may comprise a motor, air, hydraulic fluid or a thermally expandable phase change material such as wax. The displacement source may also include a mechanical spring member. When the sensing means concludes that the mount is outside its nominal configuration, the displacement source provides a force that helps to return the mount to its nominal configuration. Once the controller determines the mount is in the desired orientation, the displacement source is deactuated by either changing the phase of the material, turning off the motor or closing the supply of hydraulic fluid or air. As will be described hereinafter, when the mount experiences large, low frequency loads, the movable member typically travels through the deadband zone and the load leveling device serves to quickly return the mount to its nominal orientation.

As further shown by FIG. 4, the stiffness of the device 20 increases as the frequency of the vibration input $X_m$ or F decreases. The control bandwidth or frequency $\omega_b$ where the mount stiffness decreases is below the natural frequency $\omega_n$ of the mount. The stiffness is increased at a rate/frequency $\omega_b$ located away from the natural frequency. The controlled equilibrium device will be displaced faster if the natural frequency or damping is a large value.

Relative motion between mass 21 and base 22 is damped by damper 34 identified as Bs in FIG. 2. Integral damping is provided for all displacements of mount 20 of the present invention. In this way, by providing displacement dependent mount stiffness and the supplied damping 34, mount 20 provides the desirable low stiffness and low damping during high frequency low amplitude operating frequencies and also provides the desirable high stiffness and high damping during resonance or other periods where large loads F are applied to the mass 21 of mount 20.

The specific fifteen preferred embodiments of the invention will now be described.

First Preferred Embodiment of the Invention

Figure 5:
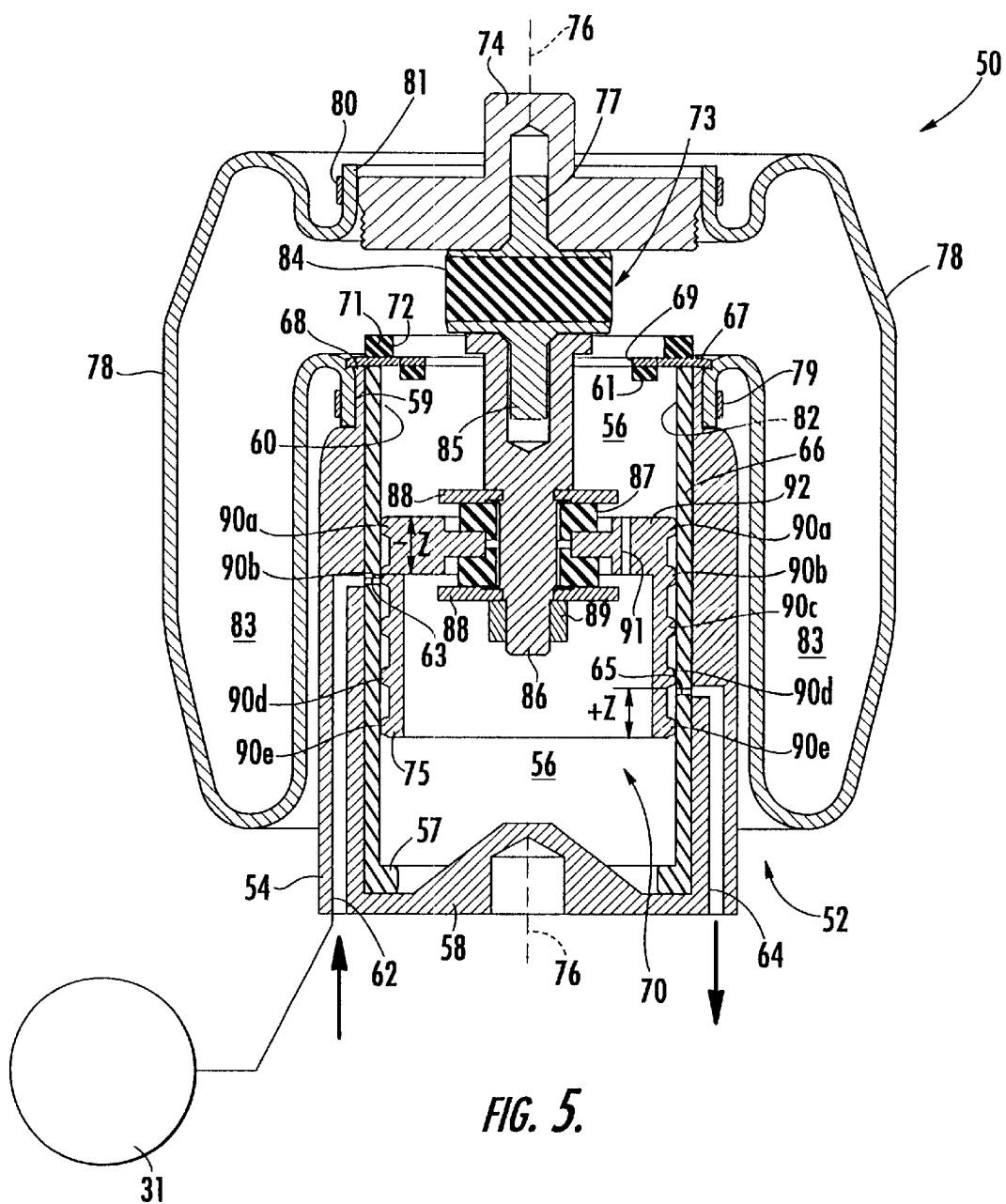
FIG. 5 is a longitudinal section view of a suspension device of the present invention.

A first preferred embodiment controlled equilibrium mount 50 is shown in the longitudinal cross section of FIG. 5. The mount of the present invention provides the requisite stiffness and softness to effectively absorb low and high frequency disturbances and no static deflections are experienced. The mount 50 comprises a housing 52 which may be cylindrical or substantially cylindrical, and the housing includes a housing wall 54 that defines a housing chamber 56. The unitary housing comprises an open end 60 and closed end 58 that may be fixed to a base or frame 22 in a conventional manner. A load leveling device 70 includes a piston member 75 movable through the housing chamber. At least one inlet passage 62 and at least one exhaust passage 64 are provided in housing wall 54 and extend through the chamber 56 and lateral end 58. A source of pressurized fluid 31 is flow connected to mount 50 at inlet 62. In this way, the pressurized fluid may be supplied to chamber 56 through inlet passage 62 when it is necessary to raise member 75 when the mount is subjected to a low frequency displacement.

A hollow cylindrical resilient member or sleeve 66 is positioned in housing chamber 56 against the inner portion of housing wall 54. The resilient element is preferably made from a natural rubber impregnated with a lubricant. The resilient element may be maintained in chamber 56 by a force fit between the housing wall and member 66 or by an adhesive such as Chemlok® adhesive manufactured and sold by Lord Corporation of Erie, Pa. As located within chamber 56, the annular stop or snubbing member 57 at one resilient member end, is seated on closed lateral end 58 and the opposite end of member 66 terminates at the open housing end 60. As shown in FIG. 5 the end of housing 60 has a smaller outer diameter than the lower portion of the housing in order to prevent resilient member 78 from displacing from its axial location along the housing 52. End cap 67 with a downturned outer periphery is seated on the housing end 60 and is held in place by engagement between the outer periphery of the end cap and an annular, outwardly directed tab 68 along the open housing end 60. The end cap 67 includes a central opening 69 which is adapted to promote fluid flow into and out of chamber 56. An annular snubbing member 61 is made integral with the end cap proximate opening 69 and is located within chamber 56 when the end cap is seated on the open housing end.

Resilient snubbing element 71 is fixed to the exterior of the cap 67 by a conventional adhesive such as by Chemlok adhesive. The snubbing element includes an opening 72 that is aligned with cap opening 69 when the snubbing element 71 is located on the cap and in combination with cap opening 69 provide a means for supplying fluid to and exhausting fluid from chamber 56.

Coupling member 73 joins hub 74 and load leveling piston 75. Both the hub 74 and piston 75 are movable along axis 76. The hub is threadably connected to stem 77 at one end and the opposite end of hub is connected to the cab 12, frame 14 or any vibrating mass or member. An expandable bag 78 made from a resilient material has a first central opening 81 and the hub is seated in the first opening with the bag held against the hub by a first conventional band 80. The cap 67 and open housing end 60 are located in the second bag opening 82 with the bag held against the open housing end 60 by a second conventional band 79. The volume of the resilient bag expands and contracts as fluid is respectively flowed out of and into the chamber 56. The bag, hub and cap define outer chamber 83.

Resilient member 84 is made integral with the first and second stems 77 and 85. The second stem 85 is threadably joined to stepped or shouldered shaft 86. The piston 75 is resiliently coupled to the shaft by resilient member 87. The resilient member is sandwiched between washers 88 and is clamped in place along shaft 86 by nut 89.

Piston member 75 of load leveling device 70 is movable in chamber 56 and is made from a metal such as aluminum or steel. The piston may also be made from a suitable plastic such as nylon 6/6. The piston is unitary and includes a body comprising cylindrical wall with a plurality of annular protuberances 90$a$, 90$b$, 90$c$, 90$d$ and 90$e$ formed along the outer portion of the wall. The piston must include at least three protuberances and for purposes of the first embodiment of the invention the piston includes five protuberances along the outer piston surface. The piston is open at one end and substantially closed at the opposite end 92. As shown in FIG. 5, the free end of shaft 86 is located within the piston body. A port 91 extends through the substantially closed piston end 92. The protuberances 90$a$–90$e$ are in frictional engagement with the resilient member 66 and as a result, each pair of adjacent protuberances produces a sealed chamber that may receive pressurized fluid from and supply such fluid to chamber 56. Surface effect damping is supplied by the contact between the protuberances and resilient layer.

For purposes of the first, second, third, fifth, sixth and seventh embodiment suspension devices, it is preferred that the resilient layer have a radial thickness between 0.0625–0.25 inch. Additionally, the preferred resilient layer is precompressed about ten percent (10%) when the piston is inserted in the housing chamber. Finally, for purposes of the first, second, third, fifth, sixth and seventh embodiments, in order to achieve proper operation of device 50, the proper contact pressure must be achieved between layer 66 and protuberances 90$a$–90$e$ relative to internal mount pressure. For example, for supply pressure of 100 psi, and internal mount pressure of 70 psi, the acceptable contact pressure is between 100–150 psi.

As shown in FIG. 5, the piston comprises deadband zone $+Z$ and $-Z$. Distance $-Z$ is the longitudinal or axial distance between the end of the piston 92 and the port 63 and the deadband displacement $+Z$ is the longitudinal distance between the open end of piston 75 and the port 65. No fluid is flowed into the chamber or exhausted out of the chamber when the ends of the piston are within the deadband zones. The sealing contact between the protuberances and layer 66 prevents the axial flow of fluid from the piston ends. When piston end 92 crosses port 63 the volume of the fluid in the chamber decreases and the pressure is then increased to increase the mount stiffness. When piston end 75 crosses port 65 the volume increases and the pressure in the chamber is decreased and the mount stiffness is decreased. The upper and lower limits are defined at snubbing elements 61 and 57. Additionally, the spacing of the air inlet and exhaust ports, protuberances and snubbing limits are designed so that pressurized fluid never enters or exits the chamber concurrently.

As the piston is displaced relative to the stationary resilient member 66 along axis 76 the engagement between the protuberances and the resilient member 66 produce surface effect damping to the movable mount components. As shown in FIG. 5, the piston includes five annular protuberances each having a semicircular cross section, however any number of protuberances with any suitable cross section may be provided along the piston body. As the descriptions of the preferred embodiments of the present invention proceed the terms "surface effect" or "surface effect damper" or "surface effect damping" as used in this application comprise and shall mean damping that is a combination of friction, viscous and hysteretic damping components resulting from the relative motion of two surfaces. The relative motion can be sliding or rolling motion for example. Frequently the moving surface is made from an elastomeric or polymeric material and frequently the elastomeric or polymeric material is self lubricated. However a layer of grease is usually included along member 66. The resilent layer 66 serves an integral valve surface and also serves as a damping surface.

Operation of first embodiment damper 50 will now be described.

When the inlet and discharge openings 63 and 65 are located between protuberances 90$a$ and 90$e$, the piston is located in its deadband zone, and the mount 50 can effectively, control high frequency, low magnitude forces applied through hub 74. As shown in FIG. 5, a fluid such as air is located in the outer chamber 83, and the chamber 56 above and below the piston 75.

When a large force is applied through the hub, such as during resonance, the force transmitted through the hub forces the coupling 73 and piston 75 along axis 76 toward closed end 58. As the piston is displaced out of the deadband zone toward end 58, and protuberance 90$a$ is located away from port 63, the pressurized fluid between the piston and end 58 is discharged through port 91 and then through openings 69 and 72 and into outer chamber 83. Additionally, the displacement of piston 75 is damped by the surface effect damping produced between the piston and resilient member 66. As the piston passes through deadband zone $-Z$, the inlet is opened and pressurized fluid from source 31 is flowed into chamber 83, increasing the mount stiffness. The damping and air supply are provided by resilient layer 66. As the pressure and resultant mount stiffness are increased the piston is moved away from the closed end and such displacement continues until the piston returns to the deadband zone and the port 63 is again closed. By increasing the stiffness of mount 50 during large forces the CEM of the present invention can absorb low frequency loading as well as high frequency, low magnitude vibration inputs. As the piston is quickly driven axially toward the open housing end the piston may not level at the operating range. The lowermost protuberance 90e may travel past discharge port 65. When protuberance 90e travels past the discharge port and through the deadband zone –Z, pressurized fluid in chamber 56 is discharged out port 65 until the piston lowers to the desired operating range. Damping is again supplied by surface effect damping between layer 66 and piston 75. Once the increased load is removed, the piston travels upward through the deadband zone +Z and when the open piston end crosses the threshold port 65, the port opens allowing fluid to exhaust through port 91 and out port 64. The fluid exhausts until the piston 75 is again in the deadband zone and port 64 is closed. For large loads, the piston may contact snubbing member 61, which increases the spring rate and stiffness of the mount.

If the compressive load is so large that the piston reaches end 58, protuberance 90e contacts annular snubbing member 57, and such contact increases the spring rate and resistive force provided by the mount.

Referring to the schematic representation of the CEM of the present invention of FIG. 2, in the first preferred embodiment of the invention damping is supplied as surface effect damping between protuberances 90 and resilient sleeve 66; the primary spring rate Kc is provided by the fluid pressure in the mount; spring Kr is provided by stop members 57 and 61 and supplemental spring rate Ks is defined as the stiffness of the bag 78. Regarding the load leveling device of the first embodiment, the displacement source or means is the fluid pressure (air pressure) within chamber 56; the sensor is the relative motion between piston 75 and housing 54; the controller is represented by the inlet and discharge openings in the integral valve. The size of the openings define the speed of the response of the load leveling mechanism.

Second Preferred Embodiment of the Invention

Figure 6:
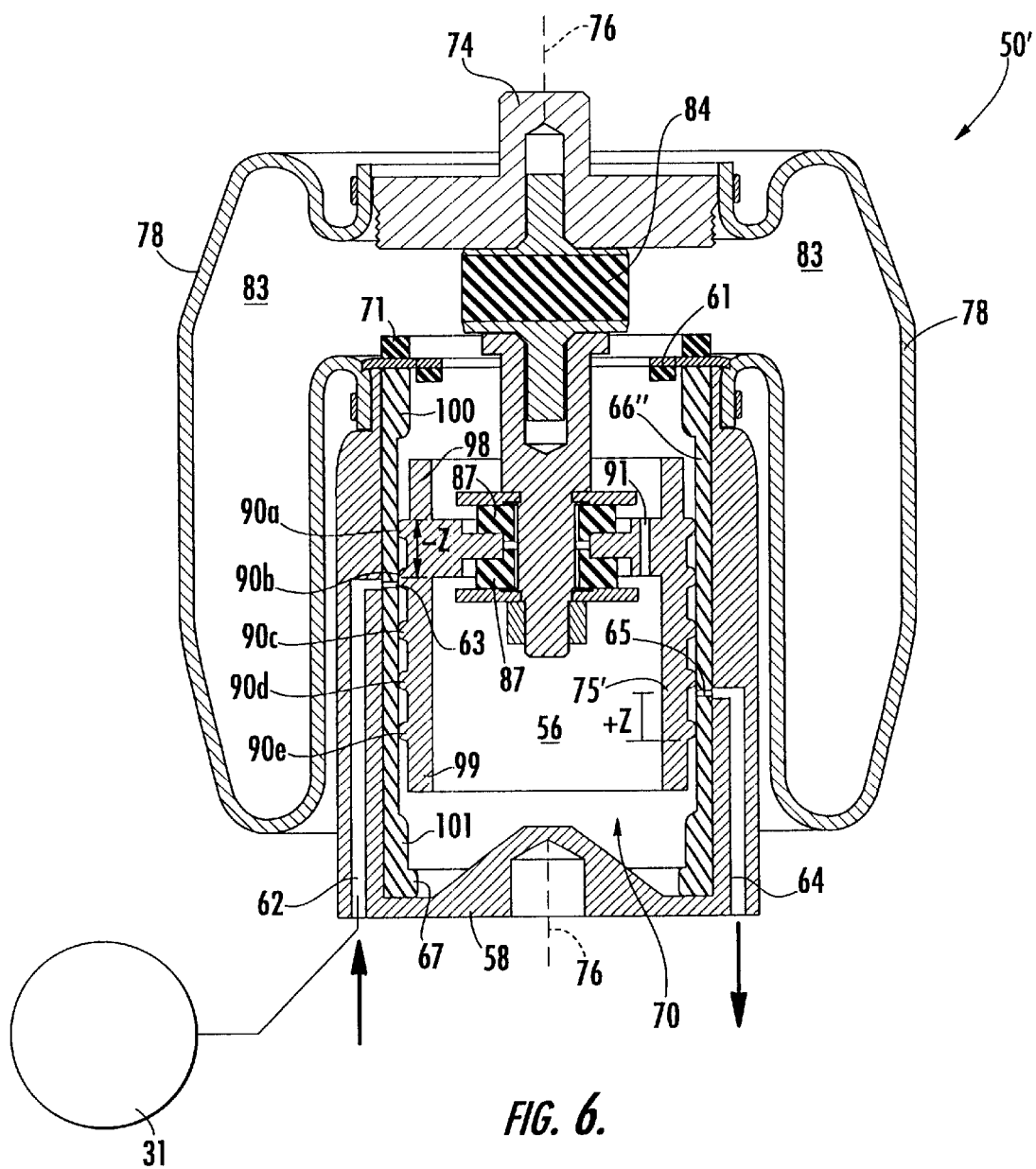
FIG. 6 is a longitudinal sectional view of a second embodiment suspension device of the present invention, similar to the first embodiment device.

A second preferred embodiment of the controlled equilibrium mount 50' of the present invention is illustrated in FIG. 6 and is similar to the first preferred embodiment controlled equilibrium mount. The second preferred embodiment mount 50' includes a modified piston member 75' and a modified resilient member 66'. In the piston body of first embodiment mount 50, the body terminates at the outer protuberances 90a and 90e. The deadband zone is again generally defined as the distance between port 62 and the protuberance 90a, –Z, and the distance, +Z, between port 64 and outer protuberance 90e. The magnitude of the deadband zone will be determined by the operating position along axis 76. For all embodiments of the invention, the values of Z and –Z may be the same absolute value or they may be different. See FIG. 6. In the piston 75' of the second embodiment mount 50', the axial dimension of piston 75' is increased by extending the ends of the piston body beyond the outer protuberances 90a and 90e. The extended ends of piston 75' are identified as 98 and 99. See FIG. 6. The resilient member 66' includes first and second annular stop members 100 and 101 at the resilient member 66' ends. The second annular member 101 is located adjacent annular member 67 inwardly of the member 67. The first member 100 is located at the opposite end of the annular member. Snubbing member 61 is located along cap 67 in chamber 56.

For large loads as the piston travels along axis 76 and approaches the closed housing end 58, the piston body portion 99 frictionally engages member 101 and provides surface effect damping that supplements the surface effect damping provided between the protuberances and resilient member wall as previously described. Alternatively, when the piston approaches the opposite housing end near outer chamber 83, supplemental surface effect damping is provided as the piston body portion 98 frictionally engages member 100. By providing supplemental surface effect damping, greater control of the displacement of the piston and other movable mount components is provided as the piston reaches its travel limits. By the supplemental surface effect damping, it is believed that the negative effects of snubbing and the instances of snubbing are reduced.

The second embodiment mount operates as previously described in the description of first embodiment CEM 50. Additionally, the springs, damping and load leveling device in the second embodiment suspension device are as described in conjunction with mount 50.

Figure 7:
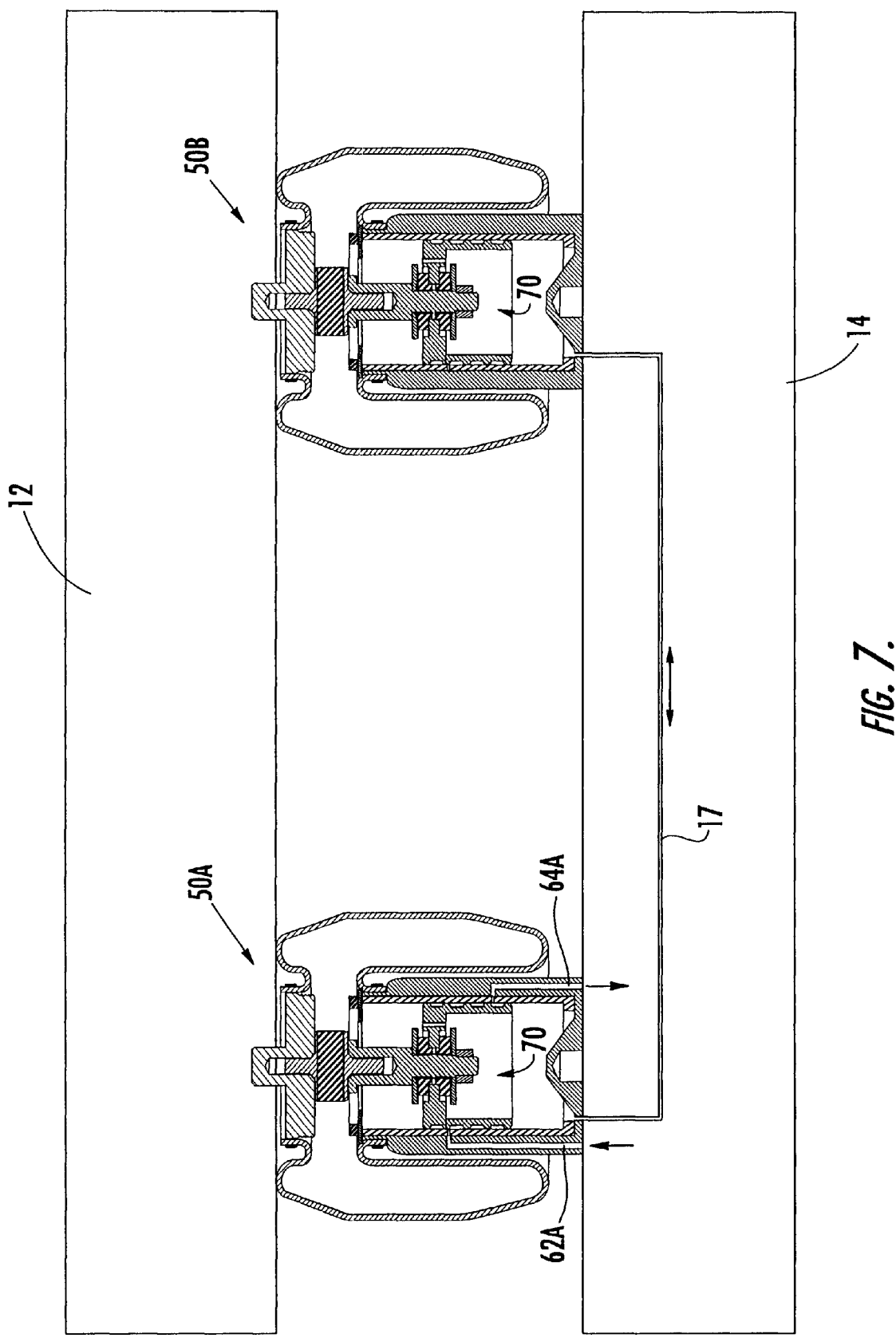
FIG. 7 is a schematic representation of a master and slave mount arrangement where the master and slave mounts are comprised of the suspension device of FIG. 6.

A master and slave mount arrangement may be provided as shown in FIG. 7. As shown in FIG. 7, like mounts 50 are flow connected by line 17 so that pressurized fluid flow is supplied to and exhausted from mounts 50A and 50B through the line 17 as required to maintain the mounts in the desired deadband zone. Primary pressurized fluid is supplied to mount 50A by pressure supply 31 (not shown in FIG. 7) at port 62A. Primary exhausting of fluid is provided at port 64A.

Third Preferred Embodiment of the Invention

Figure 8:
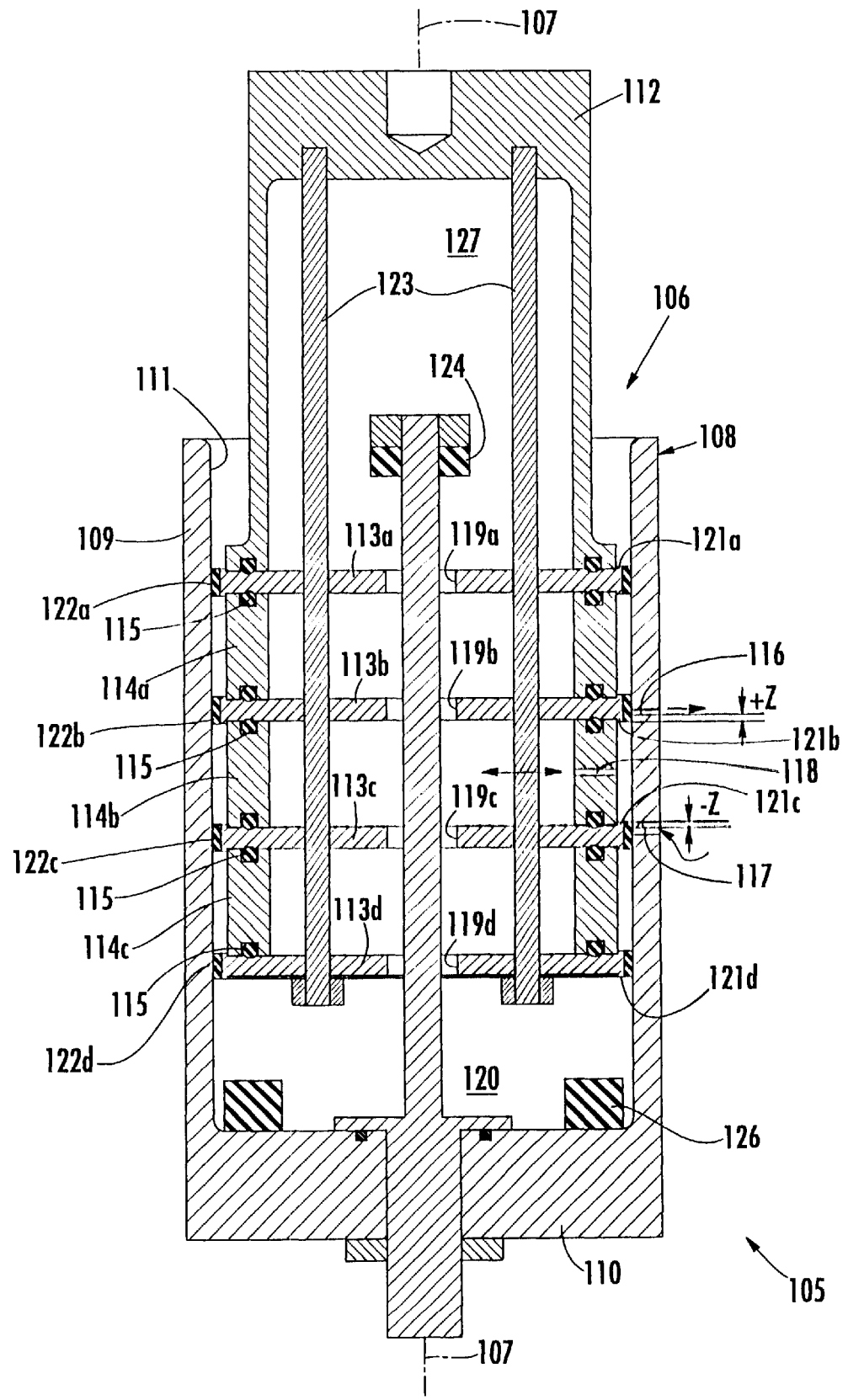
FIG. 8 is a longitudinal sectional view of a third embodiment suspension device of the present invention.

A third preferred embodiment of the controlled equilibrium mount of the present invention 105 is illustrated in FIG. 8. The third embodiment mount 105 comprises piston 106 movable along axis 107 through fixed metal housing 108. The housing may be any suitable configuration but for purposes of describing the third preferred embodiment of the invention the housing is a hollow cylindrical member with wall 109, closed end 110 and open end 111. The wall 109 and closed end 110 define a housing chamber 120. Pressurized fluid inlet 117 and pressurized fluid discharge port 116 are provided in housing wall 109 at the required locations along the wall. The closed housing end 110 is adapted to be fixed to a frame or base 14.

Piston 106 travels axially through the open housing end 111 and includes a free piston end 112 located outside of the housing and is connected to a movable mass 21 which may comprise cab 12. The piston and housing are attached to the respective mass and frame in a conventional manner well known to those skilled in the art. The piston 106 also comprises an alternating arrangement of plates 113a, 113b, 113c and 113d; and spacers 114a, 114b and 114c located in the housing chamber 120. The plates and spacers may have any suitable configuration but for purposes of describing the third embodiment CEM, the plates are disks with correspondingly centrally located openings 119a, 119b, 119c and 119d; and the spacers are hollow, annular members. The plates and spacers and body of piston 106 are made integral with the piston by a pair of elongate fasteners 123 that extend axially to join the spacers and plates to the closed piston end 112.

As shown in FIG. 8, the outer diameter of each spacer 114 is less than the inner housing diameter and as a result the spacers are separated from the housing by a distance. Each spacer includes an annular groove with a conventional o-ring or other suitable sealing member 115 seated in the groove. When the spacers and plates are placed in the alternating arrangement of FIG. 8, the sealing members 115 sealingly engage the adjacent plate. An additional, sealing member 115 is located in an annular groove in the lateral face of piston end 112. Port 118 is provided in the wall of spacer 114b and provides means for flowing pressurized fluid inwardly between the spacers and plates and for discharging the pressurized fluid outwardly and into the space between the spacers and housing 108. In use, pressurized fluid flows through the central openings 119 into housing chamber 120, between the plates and spacers and into the piston chamber 127.

First Snubbing member 124 is fixed along the end of axially oriented shaft 125 that extends through the openings 119a–119d. The snubbing member is located proximate open housing end 111. The shaft is fixed to the closed housing end 110. A second snubbing member 126 is fixed to the closed housing end 110 in chamber 120. The snubbing elements define maximum travel limits of piston 106. It is expected that the piston motion will only be snubbed by members 124 and 126 when uncommonly large loads are applied to the mount. By orienting and configuring the ports in this manner only one port will be opened during use.

Each plate includes an outer peripheral portion 121a, 121b, 121c and 121d located in the gap separating the spacers 114 and wall 109. Respective resilient elements 122a, 122b, 122c and 122d are made integral with the outer peripheral portion of each plate using a suitable adhesive as previously described. The resilient elements are comprised of a suitable rubber and sealingly and frictionally engage the stationary housing wall 109. During mount use, surface effect damping of piston 106 is produced by the relative axially displacement of piston 106 past housing 108. Referring to FIG. 8, when the piston is located in the chamber 120 in the equilibrium position as shown in FIG. 8, the resilient element 122b closes port 116 and element 122c closes port 117. Additionally, the ports 116 and 117 are located at different axial locations between the lateral edges of the resilient members. For example, the port 116 is located proximate the lower end of member 122b and the port 117 is located proximate the upper end of member 122c. By orienting the ports and resilient members in this manner, during mount use only one port may be opened at a time therefore it is not possible to concurrently supply fluid to and exhaust fluid from the housing and piston chambers.

The deadband zone defined as the displacement distances +Z and −Z is shown in FIG. 8. Generally the deadband zone distance +Z is defined as the distance between lower edge of member 122b and exhaust port 116 and deadband zone distance −Z is defined as the distance between the upper edge of resilient member 122c and inlet port 117. Although in FIG. 8 the distances +Z and −Z are shown as being equal in magnitude, the displacement distances +Z and −Z may have different absolute values.

Operation of third embodiment CEM will now be described.

During periods of high frequency low magnitude loads to end 112, the displacement of piston load leveling device 106 is maintained within the deadband zone +Z and −Z and therefore the stiffness of mount 105 remains substantially the same when the piston displacement does not exceed either deadband displacement distance. When a large transient load is applied to end 112, and the piston 106 is displaced toward closed end 110, if the resilient member travels through deadband zone −Z the port 117 is opened and pressurized fluid such as air is flowed into the housing chamber 120 and then through port 118 provided in spacer 114b and into the piston chamber 127 increasing the stiffness of mount 105 and thereby causing the piston to extend along axis 107. If the piston is displaced axially away from closed end 110, and the resilient member travels through deadband zone +Z, port 116 is opened to the flow of fluid out of chambers 120 and 121. As the fluid is exhausted the piston is displaced along axis 107 toward end 110 until the member 122b again seals port 116 and returns to the deadband zone. When either port 116 or 117 is opened, the other port is closed during operation of mount 105. Additionally, large loads that cause the mount to travel to its maximum and minimum positions at snubbers 124 and 126 increase the stiffness of the mount to quickly terminate axial displacement of the piston. At all times during displacement of piston 106 axially, surface effect damping is supplied.

Referring to the schematic representation of the CEM of the present invention of FIG. 2, in the third preferred embodiment of the invention damping supplied as surface effect damping between members 122a–122d and the housing wall 109; the first spring Kc is defined as the air pressure in the housing and piston chambers and the spring Kr is the increase in stiffness provided by snubbing elements 124 and 126. The device does not include a supplemental spring Ks. The load leveling device displacement source is comprised of the fluid pressure within chamber 120, and the sensor is the relative positions between housing 111 and piston 106; and the controller is represented by ports 116 and 117. Again, the size of the ports define the speed of response of the load leveling device.

Fourth Preferred Embodiment of the Invention

Figure 9:
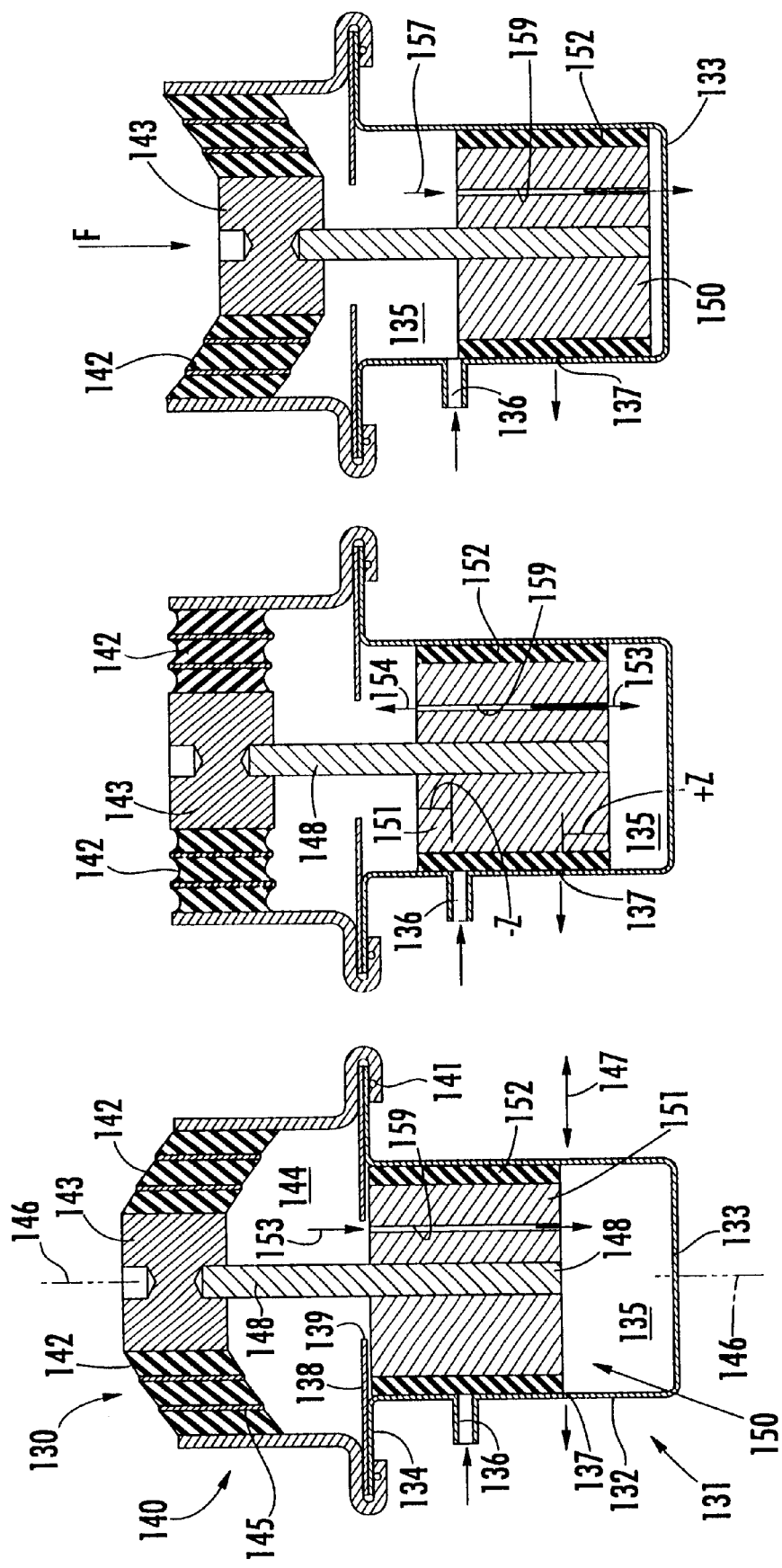
FIGS. 9A, 9B and 9C are sectional views of a fourth embodiment suspension device of the present invention which illustrate the range of motion of the fourth embodiment device.

A fourth preferred embodiment of the controlled equilibrium mount of the present invention is illustrated in FIGS. 9A, 9B and 9C and is identified as 130. FIGS. 9A and 9C respectively illustrate the mount at the extended and compressed limits of displacement and FIG. 9B illustrates the mount 130 at the leveled position in the typical mount operating range. As shown in FIG. 9B, the deadband zone −Z and +Z is also illustrated. The deadband zone is illustrated as the distance between the lower piston surface and the discharge port 131 (+Z) and as the distance between the upper piston lateral surface and the inlet port 136. As previously described the deadband displacement magnitudes +Z and −Z may have the same or different absolute values.

The fourth embodiment CEM of the present invention comprises primary housing 131 that comprises cylindrical housing wall 132, closed housing end 133 and radially outwardly directed flange 134 at the open housing end. Inlet port 136 and discharge port 137 are provided along the housing wall 132 and provide fluid communication with the chamber 135. The mount 130 is fixed to a base or frame 22 in a conventional manner at the closed housing end. The inlet 136 is flow connected to a source of pressurized fluid such as 100 psi air (not shown). The pressurized fluid exits the mount through port 137.

Rigid plate 138 with central opening 139 is seated on flange 134, and secondary housing 140 is seated on plate 138. The primary housing chamber 135 is defined by the wall 132, plate 138 and closed end 133. As shown in FIGS. 9A–9C the housing 140 is made integral with housing 131 by bending or crimping the lower end of housing 140 around the outer edges of plate 138 and flange 134. A conventional seal member 141 is sandwiched between the flange 134 and bent end of housing 140. A second housing chamber 144 is flow connected with chamber 140 by opening 139. The end of housing 140 located away from plate 138 is closed by a resilient member 142 that is bonded to housing 140 and metal inner member 143. The metal member 143 is conventionally attached to a mass 21 such as a cab for example. The chamber 144 is defined by housing 140, plate 138, resilient member 142 and metal inner member 143. The resilient member 142 is very soft in axial direction along axis 146 and is very stiff in the lateral direction 147.

The metal inner member 143 may be made integral with the upper housing 140 through a bonded assembly of elastomer 142 and metal shims 145 embedded in the elastomer during the manufacturing of resilient member 142. Metal shims may be provided to increase the lateral direction stiffness of the resilient member 142. Additionally, the elastomer member may include voids or cores arranged in such a manner to produce an elastomer member that is stiff in one lateral direction but soft in another lateral direction. In an alternate embodiment, the relatively thick resilient member 142 may be replaced by a suitable diaphragm, such as a rubber element made integral with a reinforcing material. Also, the inner member 143 may also be made from a plastic.

Rigid elongate shaft member 148 connects metal inner member with metal body 151 of movable piston 150. The member 148 may be a suitable bolt. Longitudinally extending port 159 promotes the flow of pressurized fluid through the member in direction of arrows 153 and 154 in FIGS. 9A and 9B. The port if appropriately dimensioned may provide fluid damping. The port diameter believed to produce fluid damping is less than 0.1 inch.

Piston 150 comprises the load leveling member of fourth embodiment mount 130. A relatively thin resilient layer 152 is bonded to the metal piston member 151 and covers the member 151 longitudinally. As the piston is displaced axially along axis 146, the resilient layer 152 frictionally engages the housing wall to produce surface effect damping therebetween. The elastomer is preloaded radially (typically 10%) against the housing 131. The preload provides for damping and also serves as an effective seal between the pressurized fluid in the upper and lower housing chambers 144 and 135.

A thin layer of grease is used to lower the friction between layer 152 and housing 132. Additionally, in order to maximize the useful life of the resilient layer 152 the surface roughness of the elastomer layer and the inner surface of the housing wall 132 should not exceed 32 microinches.

Operation of fourth embodiment mount 130 will now be described.

Initially the mount is depressurized so that when a load is applied to the mount inner member 143, the inner member and surface effect piston fall to the position of FIG. 9C. As a result, inlet 136 is opened which causes pressurized fluid to flow into the mount to pressurize the mount. The discharge port is closed as the mount is pressurized. Once the piston 150 rises to the centered equilibrium operating position of FIG. 2, the sealed fluid pressure in the mount is proportional to the weight the mount supports and is lower than the supply fluid pressure.

During high frequency low magnitude vibration inputs, the mount is within the deadband zone threshold displacements and as a result the mount stiffness remains substantially constant. Additionally, the load leveling device 150 remains substantially at the centered operating range shown in FIG. 9B with the resilient layer closing inlet and discharge openings 136 and 137. When the mount experiences a large magnitude transient compressive load identified as F in FIG. 9C, the member 143 and connected surface effect piston member 150 are displaced axially toward end 133 and is displaced past the deadband threshold −Z. When the piston is located at the low point within chamber 135 and out of deadband limit −Z, shown in FIG. 9C, the inlet 136 is opened permitting pressurized fluid to enter chambers 135 and 144, and as the chambers are filled, the stiffness of the mount increases and the elastomer member 142 is forced upwardly away from plate 138. Additional lift is supplied to surface effect piston 150 as pressurized fluid passes through port 159 in the direction of arrows 157 in FIG. 9C and beneath the piston. The movement of inner member 143 is damped by the surface effect damping provided by the piston as it is moved through the chamber 135. When the port is again closed by piston 150, the supply of fluid through port 136 is stopped.

When the mount experiences a large transient load that causes the mount to extend to its limit as shown in FIG. 9A, or the load is removed from 143, the inner member 143 and surface effect piston rise along axis 146 the inlet 136 is closed by the piston and as the piston passes the deadband zone threshold +Z, the discharge opening 137 is opened permitting pressurized fluid to flow out of chamber 135 and causing the piston to return to the operating range of FIG. 9B. In addition to the discharge of pressurized fluid out port 137, pressurized fluid passes through port 159 from chamber 144 and also is flowed out discharge port 137. As previously described in connection with large transient compressive loading on mount 130, during extension of the mount and as the mount is returned to the centered equilibrium position, the movement of inner member 143 is damped by the surface effect damping provided by the piston as it is moved through the chamber 135. The mount 130 valving 136, 137 have a deadband region where the pressurized fluid source and discharge valve remain closed for small motions that typically correspond to the high frequency vibration displacement across the mount. The deadband minimizes fluid usage.

Referring to the schematic representation of the CEM of the present invention of FIG. 2, in the fourth preferred embodiment of the invention, damping supplied as surface effect damping between layer 152 and the housing wall 132; the first spring Kc is defined as the air pressure in the chambers 144 and 135, the additional spring Kr is provided by resilient members (not shown) which may be made integral with the lateral faces of the member 151 and the supplemental spring rate Ks is provided by elastomer member 142. The load leveling displacement means is comprised of fluid pressure in chamber 144; the relative displacement between piston 150 and housing 132 is the sensor; and the ports 136 and 137 of the integral valve represent the controller, the size of the ports dictating the speed of response of the load leveling device.

Fifth Preferred Embodiment of the Invention

Figure 10:
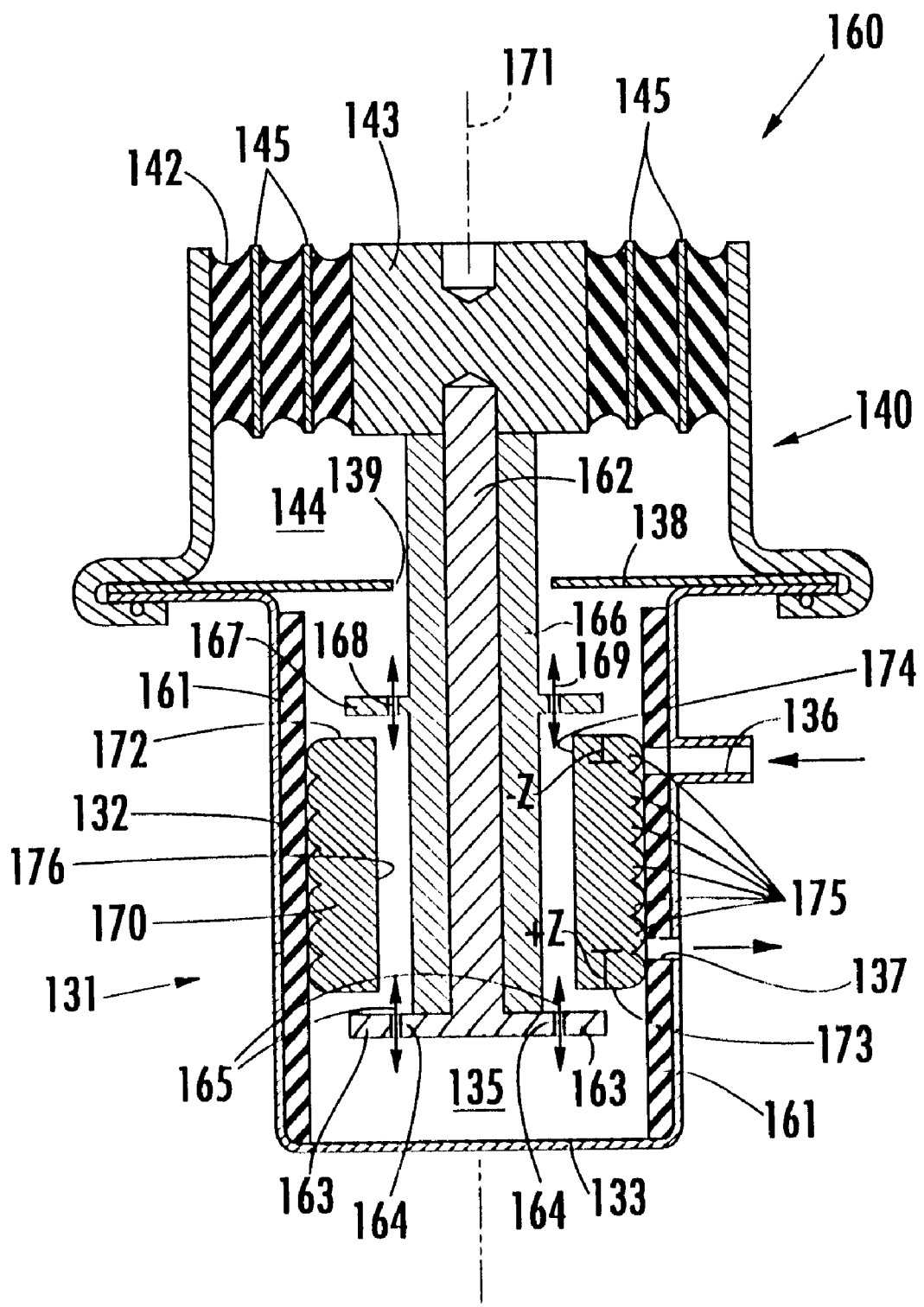
FIG. 10 is a sectional view of a fifth suspension device that is similar to the fourth embodiment device.

A fifth preferred embodiment of the controlled equilibrium mount of the present invention 160 is illustrated in FIG. 10. As shown in FIG. 10 the mount 160 is located at its centered equilibrium operating position. The CEM 160 is connected to a movable mass 21 at inner member 143 and is attached to frame 14 at housing end 133.

The fifth preferred embodiment CEM 160 is similar in structure and functionality to the fourth preferred embodiment mount 130, and fifth embodiment mount 160 includes the inner member 143, elastomer member 142, shims 145, plate 138, housing 140 substantially defining chamber 144 and housing 131 with inlet 136 and discharge 137 and substantially defining chamber 135, all as previously described in the description of the fourth embodiment controlled equilibrium device 130. The deadband zone comprised of −Z and +Z is identified in FIG. 10 with −Z and +Z again being defined as the distance between the lateral end faces of piston 170 and the respective adjacent port 136 and 137.

Resilient layer 161 is bonded to the inner portion of wall 132 of housing 131. The layer 161 is bonded to the housing in the conventional manner previously described in resilient material to metal bonding described in the other preferred embodiments of the invention. The fifth embodiment mount 160 comprises elongate shaft member 162 with a first end that is threadably connected or otherwise made integral with inner member 143 and a free end that includes an annular stop flange 163 at the free end. The stop flange 163 includes a number of openings 164 that permit flow of pressurized fluid therethrough. The directions of fluid flow are shown by arrows 165. Elongate sleeve member 166 surrounds shaft 162 between the inner member 143 and stop flange 163. The unitary sleeve includes annular stop flange 167, like stop flange 163. The stop flange includes openings 168 for flowing pressurized fluid therethrough in directions 169.

The fifth embodiment mount 160 also includes metal piston or load leveling device movable axially along axis 171. The piston is located in chamber 135 with a force fit between the piston and resilient layer 161. The piston is located between stop flanges 167 and 163 and includes a centrally located axially oriented opening 174 adapted to permit shaft 162 and sleeve 166 to move axially relative to the piston through the piston body. An annular flowpath is defined between piston opening 174 and sleeve 166. The piston 170 is moved axially with the shaft and sleeve, toward end 133 when stop flange 167 engages the lateral face 172 of piston 170 and the piston 170 is moved axially away from end 133 when stop flange 163 contacts lateral end 173. The piston is essentially dragged with the shaft and sleeve by the contact between the stop flanges and the piston body. The piston also includes a plurality of annular protuberances 175. The protuberances extend completely around the piston body and engage the resilient layer 161 when the piston is located in chamber 135. As shown in FIG. 10, the protuberances have a semicircular cross section. As the piston is displaced axially the contact between the protuberances and layer 161 provide the desired surface effect damping of mount 160.

Operation of fifth embodiment mount 160 will now be described. The mount 160 functions substantially as described in the description of fourth embodiment mount 130. Initially when the mount is centered at the equilibrium position of FIG. 10, the inlet and discharge openings 136 and 137 are closed by piston 170 as the piston is located in the deadband range.

When a large load is applied to inner member 143, the inner member, shaft and sleeve are displaced along axis 171 toward end 133. The stop flange 167 engages lateral face 172 and urges the piston toward the end 133. The piston load leveling device and sleeve move together toward end 133. Motion of the inner member is controlled by the surface effect damping provided by frictional contact between the piston protuberances 175 and stationary resilient layer 161. As the load leveling piston is displaced out of deadband zone −Z, pressurized fluid between stop flange 163 and end 133 is flowed through openings 164, flowpath 176 and openings 168 and into the upper section of chamber 135 and chamber 144. When the piston 170 passes inlet 136, pressurized fluid enters the chamber 135 and 144 and increases the stiffness of the mount. The pressurized fluid also flows through the openings and flowpath 176 toward end 133 and beneath the piston to assist in moving the piston away from the closed end 133. The flow of pressurized air is terminated when the piston has been relocated to the position shown in FIG. 9.

When the load is removed from member 143 and the mount 160 extends upwardly as shown in FIG. 9A, the stop flange 163 contacts the piston and drags it away from end 133 so that the piston moves axially with the shaft and sleeve and the members continue axially until the load leveling device is displaced through deadband zone +Z and the discharge opening is opened. Pressurized fluid then flows out of the chambers 135 and 144 through housing discharge 137. The sleeve, shaft and piston move toward end 133 until the inlet and discharge are again closed by piston 170.

Resilient snubbing members (not shown) may be made integral with the lateral faces of load leveling device 170 or the surfaces of closed housing end 133 or plate 138 that face chamber 135. In this way, the stiffness of the mount may be increased a greater amount when the load leveling device reaches its maximum displacement positions and contacts the snubbing elements.

Referring to the schematic representation of the CEM of the present invention of FIG. 2, in the fifth preferred embodiment of the invention, damping supplied as surface effect damping between layer 161 and piston protuberances 175; the first spring Kc is defined as the air pressure in the chambers 144 and 135, the additional spring Kr may be provided by snubbing provided by resilient snubbing members (not shown) if such members were made integral with the lateral piston faces or the closed housing end and plate 138 and the supplemental spring rate Ks is provided by elastomer member 142. Regarding the load leveling device, the fluid pressure in chambers 144 and 135 represent the displacement means, the relative displacement between piston 166 and housing 132 is the sensor and the holes in the integral valve whereby fluid can enter the device or is discharged from the device is the controller with the size of the openings defining the speed of response of the load leveling device.

Sixth Preferred Embodiment of the Invention

Figure 11C:
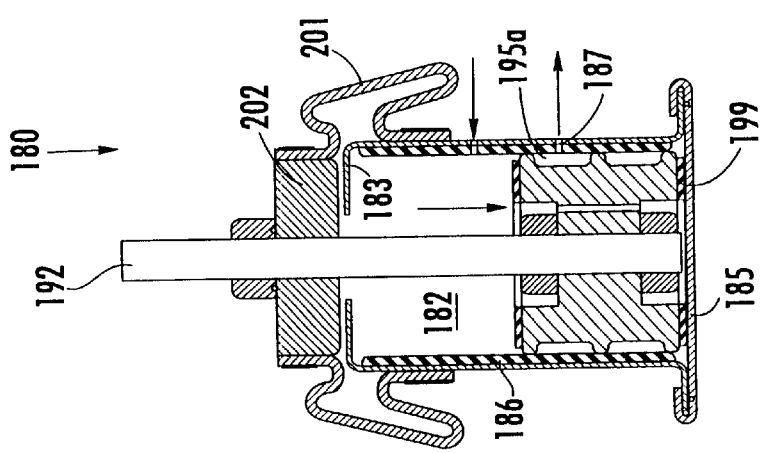
FIGS. 11A, 11B and 11C are sectional views of a sixth embodiment suspension device of the present invention which illustrate the range of motion of the sixth embodiment device.
Figure 11B:
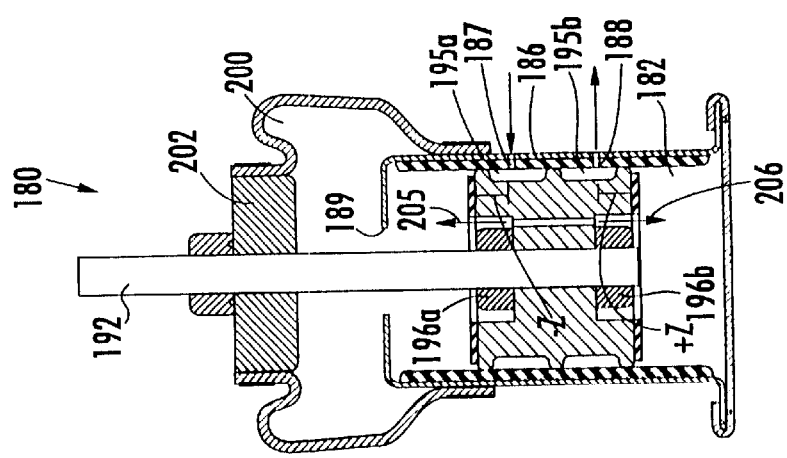
Figure 11A:
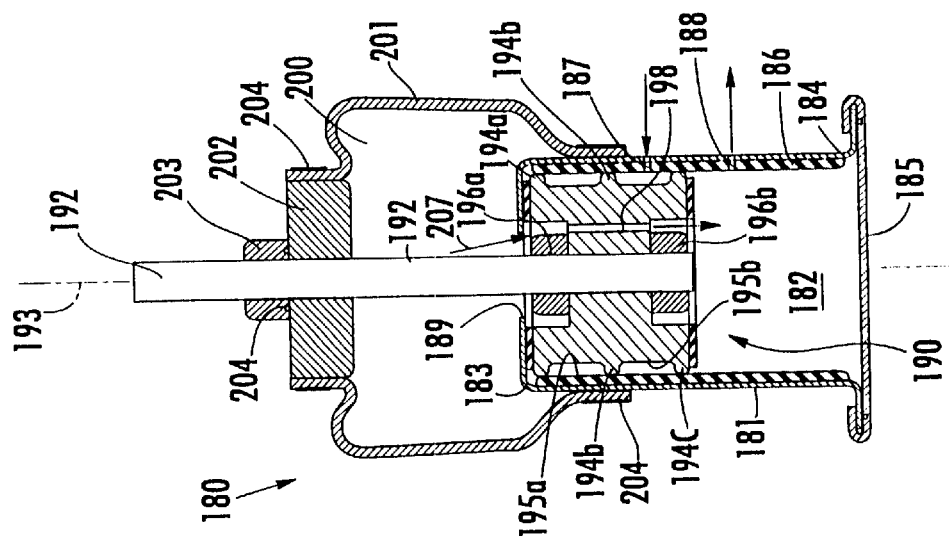

A sixth preferred embodiment of the controlled equilibrium mount of the present invention is illustrated in FIGS. 11A, 11B and 11C and is generally referred to as 180. FIG. 11B shows the mount 180 in a centered or equilibrium position, FIG. 11C shows the mount at its first travel limit compressed in response to a large transient load, and FIG. 11A shows the mount at its second travel limit extended after the load is removed. The deadband zone of displacement +Z and −Z is illustrated in FIG. 11B between the lateral load leveling piston end and the adjacent port 187 and 188.

The sixth preferred embodiment CEM comprises a cylindrical housing 181 with substantially closed first housing end 183 and second housing end 184 that is closed by discrete plate member 185. As shown in FIG. 11A, the plate edge is bent around and crimped against the flange at the second housing end 184. A conventional o-ring or other suitable seal member is provided between plate 185 and the housing flange to prevent fluid from leaking out of housing chamber 182. A centrally located opening 189 is provided in the substantially closed housing end. A layer of resilient material 186 is bonded to the inner portion of the housing wall. The material may be any suitable resilient material such as rubber for example. Respective fluid inlet and discharge ports 187 and 188 extend through the housing 181 and resilient layer 186 and a source of pressurized fluid (not shown) such as air is flow connected to the inlet 187. As will be described in greater detail hereinafter, the openings 187 and 188 are in locations along the wall required to ensure that when the piston 190 is moved away from the deadband zone or equilibrium position shown in FIG. 11B, fluid is allowed to flow through the port as required to return piston 190 to the equilibrium position shown in FIG. 11B.

Piston 190 is located in housing chamber 182 and is movable in the chamber along axis 193 with shaft 192. The piston is threadably connected to one end of the shaft. The shaft passes through opening 189 in end 183. As shown in FIGS. 11A, 11B and 11C, the piston is made from a suitable metal such as a steel and has an H-shaped cross section with a three axially spaced annularly extending protuberances 194a, 194b and 194c along the outer periphery of the piston body. The protuberances engage the resilient layer 186 and surface effect damping is supplied as a result of such engagement as the piston is displaced through chamber 182. When the piston is located in chamber 182, piston chamber 195a is defined by layer 186, piston 190 and protuberances 194a and 194b; and piston chamber 195b is defined by resilient layer 186, piston 190 and protuberances 194b and 194c. The piston is maintained fixed at its location at the shaft end by locking nuts 196a and 196b that are tightened down onto the piston body within recesses provided at the piston ends. Piston axial port 198 extends through the piston body and includes upper and lower end sections that are defined by the locking members 196a and 196b and the piston body. As required, fluid may flow axially through the port 198 to supplement the fluid provided through ports 187 and 188 and more efficiently locate the piston to the desired equilibrium position. Resilient snubbing members 199 are made integral with piston body 190 along the laterally extending surfaces at the ends of the piston. The snubbing members serve as "bumpers" so that as the piston 190 approaches its travel limits shown in FIGS. 11A and 11C, the resilient snubbing member engages the metal closed housing ends 183, 184 and in this way undesirable metal-to-metal contact between the piston and housing is avoided and the stiffness of the mount is increased to immediately prevent further travel of load leveling member 190.

A second chamber 200 is located outside housing 181 and is defined by housing end 183, expandable bladder or bag 201 and end cap 202. Contrasting the volume of chamber 200 in FIGS. 11A and 11C, the chamber is expanded to a maximum volume when the load leveling piston is at its maximum extended travel limit of FIG. 11A and the chamber is collapsed to a minimum volume when the leveling piston reaches its compressed travel minimum of FIG. 11C. The metal cap 202 is threadably made integral with shaft 192 and is maintained in the desired location along shaft 192 by nut 203. The desired seal between nut 203 and cap 202 is produced by a conventional o-ring seal member. The open ends of bladder 201 are maintained fixed against the exterior of the end cap 202 and the housing 181 by conventional annular locking straps or tension bands 204.

Operation of the sixth embodiment CEM of the present invention 190 will now be described. The free end of shaft 192 protruding through end cap 202 is conventionally fixed to the frame of a truck or other vehicle and the housing 181 is conventionally fixed to the vehicle frame or base at end 184. Loads are applied to the mount 180 at the free shaft end. When the piston is located at the centered, equilibrium position the inlet and outlet ports 187 and 188 are respectively laterally aligned with annular piston chambers 195a and 195b so that as necessary pressurized fluid from the fluid source is flowed into chamber 195a and fluid is discharged out port 195b. The seals supplied by the protuberances prevent fluid from flowing into or exhausting out of chamber 182 until the load leveling member has traveled through one of the deadband displacement zones, thereby opening one of the ports to the desired fluid flow. As indicated by arrows 205 and 206 in FIG. 11B, fluid is flowed axially during periods of typical loading to chambers 200 and 182 as required to maintain the piston 190 at the equilibrium position.

When a large upwardly directed low frequency load is supplied by the supported member to the mount 180, the shaft and piston are forced axially along direction 193 toward end 184. When the piston is displaced through zone −Z, the port 187 is opened to the flow of pressurized fluid into the chamber 182. Surface effect damping is provided between the protuberances and layer 186 as the piston is translated through the housing chamber 182. Any fluid located in the chamber at housing end 184 is flowed through port 198 to evacuate the fluid from the housing chamber at housing end 184. The flexible bladder 201 is collapsed as the endcap is drawn closely adjacent housing end 183. At the fully compressed position of FIG. 11C, substantially all of the remaining fluid is located in chamber 182 between piston 190 and end cap 202. Chamber 195a is aligned with discharge port 188 and the fluid in the chamber 195a is exhausted out port 188. No other fluid is exhausted out port 188 when the load leveling device is compressed. The inlet port 187 is unobstructed and the pressurized fluid freely flows into chamber 182 to increase the mount stiffness and also to fill chamber 200 and against end cap 202 to quickly urge the piston axially upwards to the centered position and again through the deadband zone. The mount stiffness is again increased if during compression snubbing member 199 contacts the closed housing end.

When the load is removed or is applied to shaft 192 to cause the mount to extend, the shaft and piston are displaced along axis 193 through deadband zone +Z toward housing end 183. Once the load leveling piston has traveled through distance +Z, port 188 is opened and fluid is exhausted out of port 188. If the load is significant, as the piston approaches opening 189, the resilient snubbing member 199 will contact the housing end 183 as the load leveling piston reaches its travel limit. Such snubbing will increase the mount stiffness. As the piston is moved away from the housing end, substantially all of the fluid located in chamber 182 between housing end 183 and the upper end of piston 190 is forced through opening 189 into chamber 200. A portion of such fluid is flowed through axial port 198 in direction 207 shown in FIG. 11A. The bladder 201 expands and the end cap is urged away from housing end 183. When the piston reaches its travel limit, inlet port 187 is aligned with annular piston chamber 195b and the pressurized fluid fills the chamber 195b. The filled chamber increases the piston weight and helps bias the piston to the centered position. Additionally, at the limit position, the discharge port is unobstructed and the fluid in chamber 182 between the piston 190 and plate 185 is discharge out of the opening 188. In this way, the fluid pressure in the chamber 182 is reduced and the piston is urged back to the centered position. Surface effect damping is supplied during all displacement of load leveling member 190.

Referring to the schematic representation of the CEM of the present invention of FIG. 2, in the sixth preferred embodiment of the invention, damping supplied as surface effect damping between layer 186 and piston protuberances 194a, 194b and 194c; the first spring Kc is defined as the air pressure in the chamber 182 above and below the piston 190, the additional spring Kr is provided by resilient snubbing members 199 integral with the lateral faces of the piston member 190 and the supplemental spring rate Ks is provided by the airspring bladder 201. Load leveling displacement is supplied by the fluid pressure within chamber 200, the relative displacement between piston 190 and housing 181 is the sensor, the openings in the integral valve for inlet and discharge flow is the controller with the size of the openings dictating the speed of leveling control.

Seventh Preferred Embodiment of the Invention

A seventh preferred embodiment of the controlled equilibrium device of the present invention is illustrated in FIG.

12 and identified generally at 210. As with the previously described preferred embodiments of the CEM of the present invention, the seventh embodiment device may be used as a mount in aircraft, and land vehicles to support a variety of vibrating components thereof. The fluid used to maintain load leveling is a thermally sensitive material with a large coefficient of thermal expansion such as a paraffin wax for example. The thermally sensitive material produces a large thermal expansion during its phase change from a solid to a liquid. As will be described hereinafter, as the load F applied to the mount varies and the mount is contracted beyond the normally experienced displacements, the thermally sensitive material is heated and expanded to return the displaced mount to the desired leveling position. The heater 221 is actuated by closing a circuit switch as contacts 234a and 234b are moved into contact, therefore the deadband displacement distance Z is the distance required to close the contacts.

Figure 12:
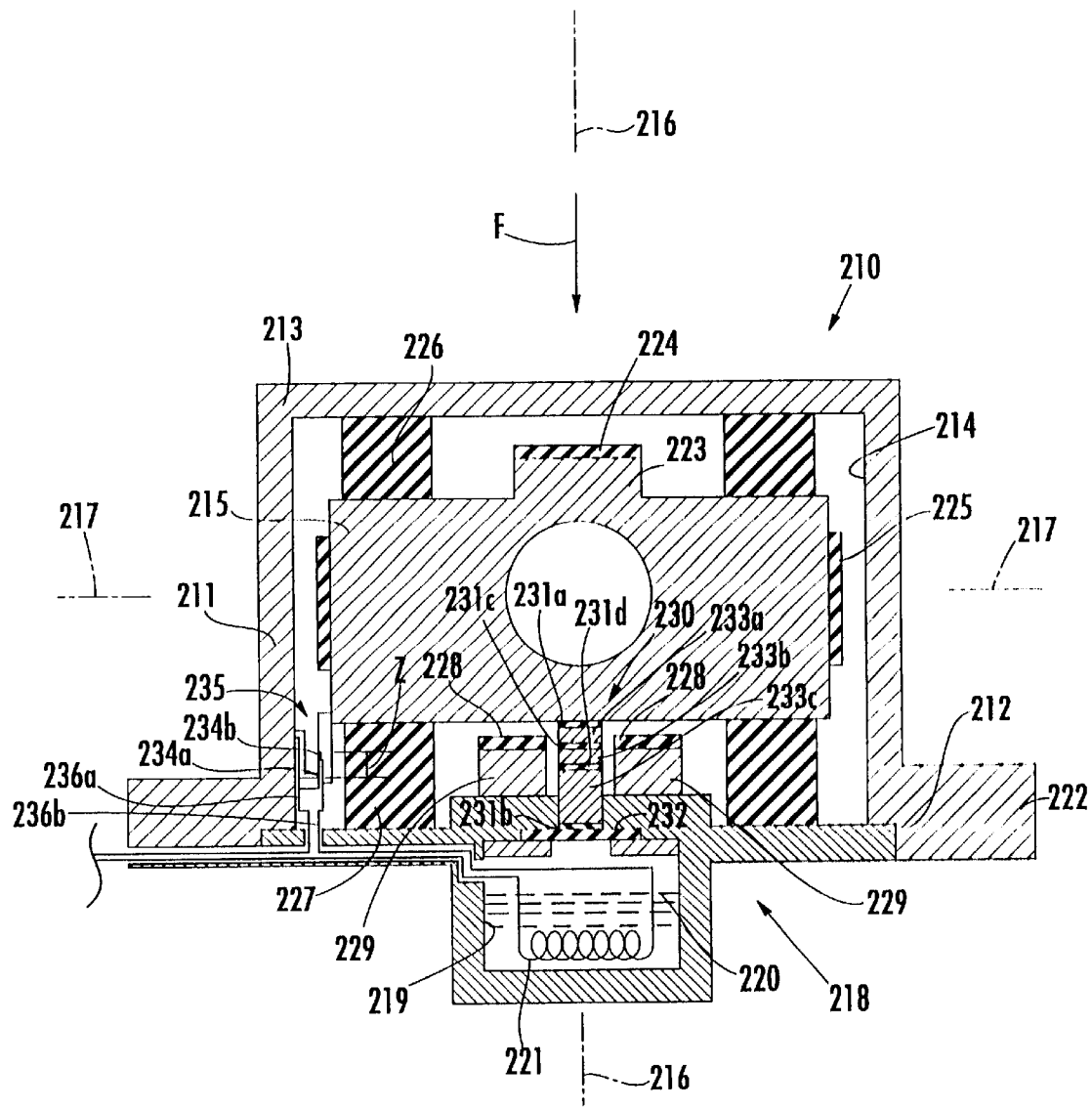
FIG. 12 is a sectional view of a seventh embodiment suspension device of the present invention.

The seventh embodiment controlled equilibrium mount comprises a housing 211 that further includes open and closed housing ends 212 and 213 and defines housing chamber 214. The housing may assume any suitable configuration but for purposes of describing the seventh preferred embodiment controlled equilibrium device the housing is cylindrical. The engine or other movable member is fixed to the closed housing end 213 and the housing flange 222 at open housing end 212 is fixed to a frame 14. The open housing end 212 is closed by cap 218. The cap defines a cap chamber 219 that houses a volume of a thermally sensitive material 220 previously described above. The thermally sensitive material is expanded by actuating a conventional heating element 221 also housed in chamber 219. The heating element is immersed in the material 220. The functionality of the heating element will be described in greater detail hereinafter. In an alternate embodiment of mount 210, the thermally sensitive material could fill a chamber defined by resilient element 227, cap chamber 219 and inner member 215. The closed upper portion of the cap, snubbing elements 229 and shear pad 230 would not be included in such an alternate embodiment. Such a modified configuration would include contacts 234a and 234b in the chamber that contains the wax. The contacts would be suitably sealed from the wax. Such a modified configuration would provide a softer mount than the mount illustrated in FIG. 12.

A displaceable inner member 215 is located in the chamber and is movable in response to applied load F, within the chamber 214 along longitudinal axis 216 and along laterally extending axis 217. The member includes a raised hub 223 with a longitudinal snubbing element 224 bonded to the hub. Lateral snubbing element 225 is bonded to the exterior of the laterally directed portion of the inner member 215. The longitudinal snubbing element contacts closed end 213 when the member 215 is displaced longitudinally along axis 216 toward closed housing end 213 and reaches its limit of travel at the closed end. The longitudinal snubbing element contacts the wall of housing 211 when the member 215 is displaced laterally along axis 217 and reaches either of its lateral limits defined by the housing wall. Additional longitudinal snubbing elements 228 are made integral with pedestal members 229 that are in turn made integral with the interior of cap 218. The member 215 contacts the snubbing elements 228 when the member 215 is displaced longitudinally along axis 216 toward open housing end 213 and reaches its limit of travel at the elements 228. All of the snubbing members are preferably comprised of a resilient material such as natural rubber and are bonded to the member and hubs in a conventional well known manner. The snubbing member increases the mount stiffness when they are contacted at the mount travel limits.

Respective first and second resilient mount members 226 and 227 made from a rubber or another suitable resilient material, are respectively sandwiched between the housing closed end 213 and member 215 and between cap 218 and member 215. See FIG. 12. Integral damping is provided to the mount by the resilient members. The members may be substantially annular and may have any suitable cross sectional configuration. The members may be wedged between respective component parts but preferably the resilient members are fixed to the mount components using a conventional bonding process. The resilient members accommodate axial or compressive loadings applied to the mount 210. A plurality of spaced apart metal shims may be embedded in the resilient members 226 and 227 if greater axial stiffness of the mount 210 is required.

Shear loads applied to mount 210 are accommodated by shear pad element 230 oriented in axial direction 216. The shear pad includes alternating metal and resilient layers 231a, 231b, 231c and 231d. A first resilient layer 231a is bonded to the underside of member 215 between the snubbing elements 228 and a second resilient layer 231b is bonded to resilient diaphragm member 232 seated in the cap above chamber 219. The metal members 233a and 233b separating the resilient elements 231a, 231c and 231d are of substantially the same axial dimension and element 233c has an axial dimension that is significantly greater then elements 233a and 233b. During operation the diaphragm 232 may flex axially and laterally to support mount loads.

Position switch 235 is located in chamber 214 and for purposes of describing the seventh preferred embodiment of the invention the switch is located in the radially or laterally extending space between the inner member and housing wall. The switch includes a pair of contacts 234a and 234b mounted along the interior of the housing wall and along the outer lateral periphery of the inner member. During use, contact 234b moves axially relative to contact 234a with inner member 215 as the inner member vibrates. The contacts are electrically connected to respective leads 236a and 236b which in turn are electrically connected to a voltage source (not shown). The leads are passed through a small, sealed opening in chamber 219. The relative size of the opening in the chamber is slightly exaggerated in FIG. 12 in order to clearly show leads 236a and 236b. No material 221 leaks out of the chamber during expansion thereof.

Operation of the seventh embodiment mount 210 will now be described. The mount uses a thermal expansion actuator to thermally expand a material to keep the mount in the desired position in the presence of varying loads. During the application of typical high frequency vibratory loads to mount 210, the inner member 215 is compressively displaced within the deadband zone and as a result the axial displacement is not sufficient to align the contacts 234a and 234b and close the circuit to actuate coil 221. When a large load F is applied to the mount, the inner member is displaced along axis 216 through the deadband zone causing contact 234b to move across contact 234a, and thereby closing the circuit causing coil to heat and ultimately expand material 221. As the material changes phase and expands, the pressure in chamber 219 increases urging flexible diaphragm away from the chamber thereby urging inner member 215 in the same axial direction, until the mount returns to the desired level position. As the inner member moves away from chamber 219, the contacts are moved out of alignment breaking the circuit and terminating expansion of the material. The material is expanded quickly thereby returning the mount to the desired level position in short time. Extension of the mount is prevented by members 226, 227 and 230.

Referring to the schematic representation of the CEM of the present invention of FIG. 2, in the seventh preferred embodiment of the invention, integral damping is supplied by the resilient properties of resilient members 226 and 227; the first spring Ks is defined as the resilient members 226 and 227, the additional spring Kr is provided by snubbing members 224, 225 and 228 and the supplemental spring rate Kc is provided by the spring provided by material 220 in chamber 219 and/or elastomer 231. Regarding the load leveling device the displacement means is represented by the combination of the heater element 221 and expansion of the thermally sensitive material in chamber 220; relative motion between inner member 223 and housing 211 is the sensor and the contact switch 235 provides the control signal to turn the heater off or on. The time it takes the thermally sensitive material to expand represents the speed of response of the load leveling system.

In an alternate embodiment of the invention, the resilient element 227 may be replaced by a sandwich of alternating Belleville washers and rubber elements. The Belleville sandwich would be located between inner member 215 and axially displaceable piston movable in chamber 219. The alternate embodiment would not include the snubbers 229 shear pad 230, diaphragm 232 or upper cap portion shown in FIG. 12. The softness of the actuator would reside in the Belleville sandwich.

Eighth Preferred Embodiment of the Invention

Figure 13:
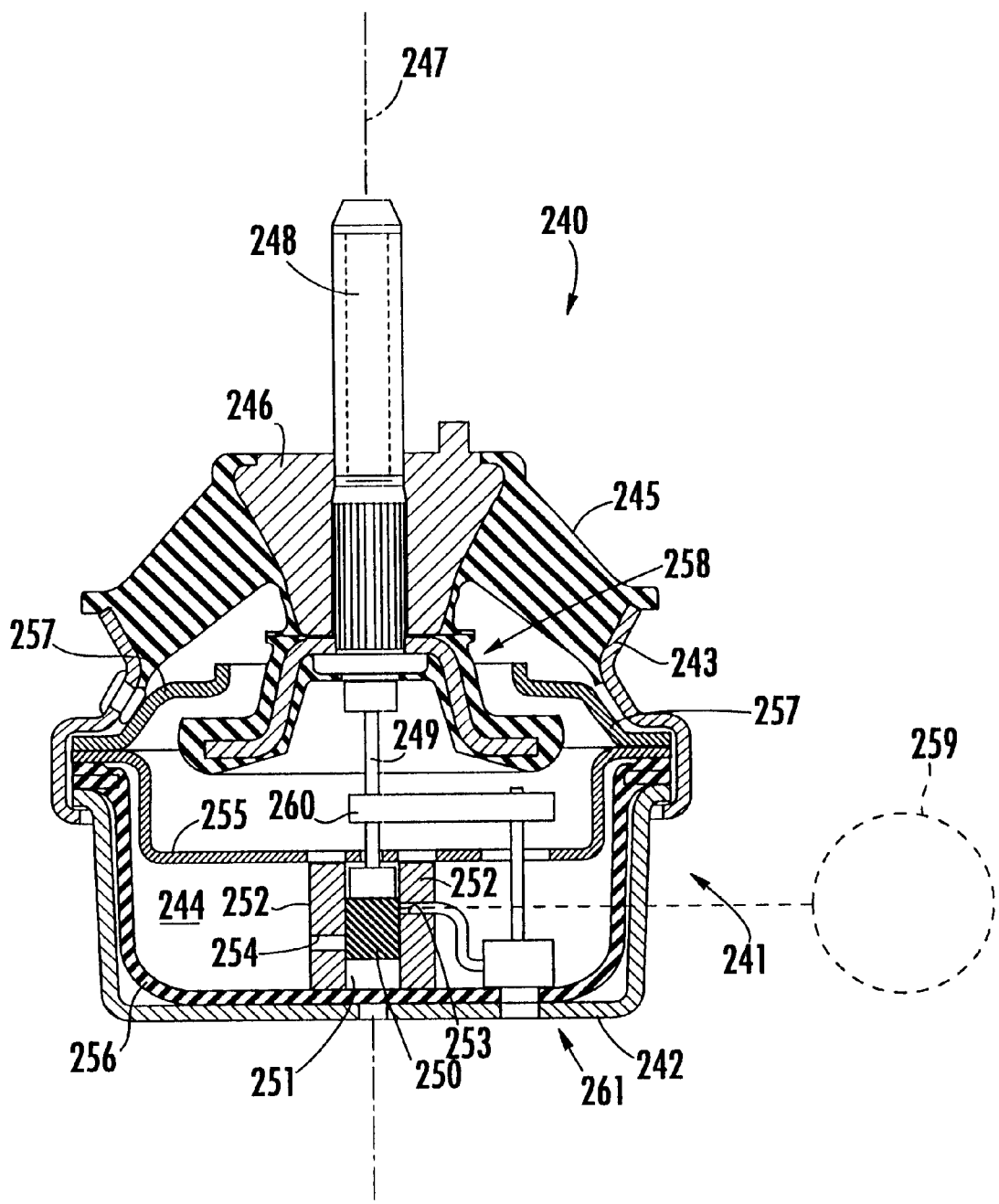
FIG. 13 is a sectional view of an eighth embodiment suspension device of the present invention.

An eighth preferred embodiment of the controlled equilibrium device of the present invention 240 is illustrated in FIG. 13. The eighth preferred embodiment mount 240 comprises a mount that is intended for use in automotive applications. When large, low frequency loads are applied to the mount to compress the mount, a pressurized fluid such as air is supplied to the CEM causing the mount to extend and return to the level position. Conversely, when the mount is extended the pressure in the mount is reduced causing the mount to lower and return to its level position. The pressurized fluid may be supplied from a dedicated pressurized fluid supply or may be pumped into the mount by a pump. The deadband zone of displacement is defined as the distance between the lateral end face of load piston 250 and port 253 (−Z) and the opposite lateral face of piston 250 and port 254 (+Z).

Now turning to FIG. 13, eighth embodiment mount 240 comprises a housing 241 with closed end 242, open end 243 and defining housing chamber 244. Resilient element 245 joins the open housing end with rigid coupling element 246. The resilient element may be comprised of any suitable resilient material and the element accommodates displacement of the coupling element along axis 247 when large loads are applied to shaft 248 which in turn is coupled to element 246 in a conventional manner, such as by a key or spline connection. The shaft is connected to a cab, engine or other vibrating member, and the closed end of the housing is fixed to a frame 14.

The end of the shaft extending outwardly from coupling member 246 is connected to piston shaft 249 which in turn is connected to resilient cylindrical piston member 250. The shaft 248, piston shaft 249 and resilient member travel axially as a single unit along axis 247 and the piston member moves through the piston chamber 251 defined by cylindrical metal sleeve 252. Inlet and discharge ports 253 and 254 respectively are provided in the sleeve and depending on the location of the piston along the sleeve length, both ports may be sealed by the resilient piston or one of the ports may be opened. The piston sleeve 252 is fixedly located between lower resilient floor 256 and rigid metal tray 255. The resilient element 256 and tray 255 are maintained stationary along their outer periphery by housing 241.

The outer peripheral portion of shroud 257 is seated on tray 255 and overlies snubbing element 258 that is made integral with the end of shaft member 248 located in chamber 244. As shown in FIG. 13, the snubbing element is comprised of a metal inner member connected to shaft 248 in a conventional manner and rubber layer molded over the metal inner member. The snubbing element is adapted to contact shroud 257 when the mount reaches its extension limit and tray 255 when the mount reaches its travel limit in compression.

Pressurized fluid such as air may be supplied to inlet 253 either by means of direct connection to pressurized fluid source 259 or by a pump with an integral accumulator 261 which stores pressurized air which the pump produces in response to small regular displacements of link 260. Regardless of whether source 259 or pump 260 is used as the source of pressurized fluid, the pressurized fluid is supplied to mount 240 when the inlet is opened as the piston 250 is displaced through the deadband distance −Z. The pump 240 may comprise a conventional micropump with a flexible diaphragm member. The chamber 244 contains a volume of pressurized fluid required to absorb vibratory loads within a predefined typical frequency range.

Operation of eighth embodiment mount 240 will now be described. During operation, when typical loads are applied to shaft 248 of mount 240, small displacements of shafts 248 and 249 and piston 250 are experienced but are not of sufficient magnitude to displace the piston 250 through the deadband displacement zone to open either discharge port 254 or inlet port 253 and as a result, during typical high frequency vibratory displacements the inlet and discharge ports remain closed by piston 250. The chamber 244 is pressurized by air or another suitable fluid. When a low frequency, large compressive load is applied to shaft 248, the shaft 248, piston shaft 249 and piston 250 are displaced axially toward housing end 242. As the piston approaches end 242, through deadband distance −Z, the inlet port 253 is opened. The stiffness of mount 240 is increased as the pressurized fluid from source 259 or pump 260 is flowed into sleeve piston chamber 251 increasing the pressure in chamber 244 and causing the mount to return to its leveled position. The pressurized fluid is supplied to chamber 244 through sleeve 252 until the piston returns to again sealingly cover inlet port 253.

When the mount is extended and the piston is displaced an amount greater than deadband displacement +Z, causing the discharge port 254 to open, the pressurized fluid in chamber 244 is exhausted out port 254 and port 263 in closed end 242 and layer 256. The fluid is exhausted until the piston returns to sealingly close port 254. The load leveling device displacement source is the pressurized air from source 259 or pump 260, the controller is the piston valve 250 and the sensing means is the inlet and discharge ports as they are opened by movement of the piston valve.

Referring to the schematic representation of the CEM of the present invention of FIG. 2, in the eighth preferred embodiment of the invention, integral damping is supplied by the resilient properties of resilient member 245; the first spring Kc is defined as the pressure of the fluid in the chamber 244 and in the chamber defined between element 245 and tray 255, the additional spring Kr is provided by snubbing member 258 and the supplemental spring rate Ks is provided by the spring provided by rubber element 245. Regarding the load leveling device, the fluid pressure within chamber 244 represents the displacement means; the relative displacement between piston 249 and housing 255 is the sensor; the openings in the integral valve housing 253 and 254 is the controller with the size of the openings defining the speed of response of the load leveling mechanism.

Ninth Preferred Embodiment of the Invention

Figure 14:
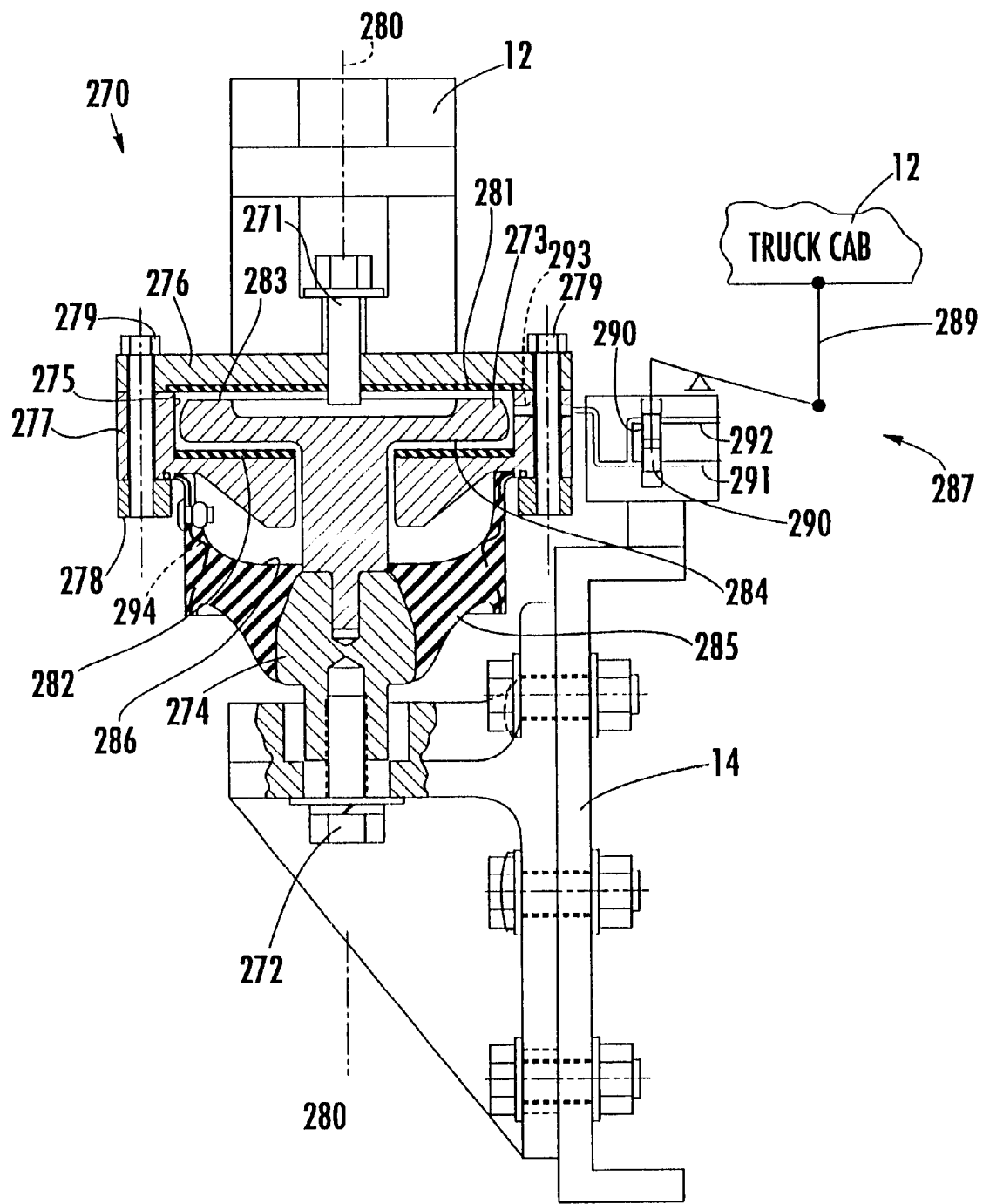
FIG. 14 is a sectional view of a ninth embodiment suspension device of the present invention.

A ninth preferred embodiment of the controlled equilibrium device of the present invention is illustrated in FIG. 14 as 270. The mount 270 is fixed at one end by a bolt connection 271 to truck cab 12 and is made integral with frame 14 by a second conventional bolt connection 272.

T-shaped stem 273 is threadably connected to coupling member 274 which in turn is fixed to frame 14 by fastener 272. The stem and coupling member are stationary during operation of mount 270. The relatively wide portion of stem 273 is located in a first housing chamber 275 that is defined by housing plate 276 and intermediate housing member 277. A housing ring 278 is made integral with the intermediate housing member and housing plate 276 by bolt connections 279. The housing plate 276 is made integral with cab 12 by bolt connection 271, and as a result, when vibratory disturbances are applied to the mount, the housing members 276, 277 and 278 are displaced along axis 280.

The inner surfaces of the plate 276 and intermediate member 277 include resilient snubbing elements 281 and 282 respectively, made integral with the surfaces. As shown in FIG. 14, the snubbing members 281 and 282 are closely adjacent faces 283 and 284 of the wide portion of T-shaped stem member 273. The resilient snubbing elements may be made from any suitable rubber or other resilient material. When the faces 283 and 284 contact the snubbing elements, the stiffness of mount 270 is increased considerably.

The coupling member 274 and intermediate housing member 277 are joined by resilient tubeform mount member 285. The member may be made from a suitable elastomer and may be made integral with the coupling and housing members during a conventional molding process or may be bonded to the members in a separate operation. The resilient member provides axial mount stiffness to control cab vibration. A second housing chamber is defined by the resilient member 285, and intermediate housing member 277. During use, the housing chambers 275 and 286 are pressurized by a volume of fluid to a predetermined pressure so that in combination with member 285, the mount effectively isolates high frequency, low amplitude vibratory disturbances. Metal stiffening members 294 are molded in resilient member 285 in order for member 285 to support the pressure in the housing chambers.

Conventional load leveling valve arrangement 287 is flow connected to housing chambers 275 as shown in FIG. 14 by main flow line 293. The load leveling valve member 290 is connected to a linkage which in turn is connected to the cab 12 so that when the cab is displaced a significant distance in either direction the valve is moved by the linkage opening either the supply line 291 to the flow of pressurized fluid into the chambers or exhaust line 292 to flow fluid out of the chambers. The supply line is flow connected to a source of pressurized fluid such as a compressor or storage tank, neither is shown in FIG. 14. The valve arrangement is of conventional design well known to one skilled in the art and therefore further description of the valve arrangement is not required. The deadband zone of displacement for mount 270 is the sum of the distances between the ends of valve member 290 and the respective ports 291 and 292. Movement of valve through one portion of the deadband zone opens a valve port however the other port remains sealed by the valve 290.

Operation of the ninth embodiment CEM will now be described. During typical vibratory inputs to cab 12, the valve exhaust and supply lines 292 and 291 remain sealed by valve 290 as the valve is displaced with the deadband range. The pressurized fluid in the chamber and resilient member maintain the mount in the desired level position. When large compressive loads are applied to the mount, the housing is displaced downward along axis 271 and through deadband zone −Z. As a result of the displacement of cab 12, linkage 289 causes load leveling valve 290 to open supply line 292 to the flow of pressurized fluid from pressurized fluid source (not shown). Exhaust port 291 is closed by valve 290. The stiffness of the mount is increased as the fluid is supplied to the chamber 275. If the transient load is large enough, the snubbing member 281 will contact face 283 at the travel limit and the mount stiffness will be further increased. As the pressurized fluid is supplied to chamber 275, the mount is returned to its level position causing the cab to moved upward and thereby again closing the valve to the supply of fluid. When large forces extending the mount are experienced, the housing is displaced upwardly along axis 271. Movement through the deadband zone +Z, opens port 291 exhausting fluid out of chamber 275. Again if the input is of sufficient magnitude snubbing member 282 may contact face 284 at the upper travel limit further increasing the mount stiffness. Movement of the linkage causes the exhaust port to be opened thereby permitting pressurized fluid to be flowed from the chamber 275 to return the mount to its level position. As the fluid is exhausted, the supply line 292 remains closed by the valve.

Referring to the schematic representation of the CEM of the present invention of FIG. 2, in the ninth preferred embodiment of the invention, integral damping is supplied by the resilient properties of resilient member 285; the first spring Kc is defined as the fluid pressure in the chambers 275 and 286, the additional spring Kr is provided by snubbing members 281 and 282 and the supplemental spring rate Ks is provided by the spring provided by the resilient member 285. Regarding the load leveling device, the fluid pressure in the mount is the displacement device, the relative motion between the cab and frame is the sensor and the openings in the housing 292 or 291 where fluid can enter or discharge from the housing chamber is the controller.

Tenth Preferred Embodiment of the Invention

Figure 15:
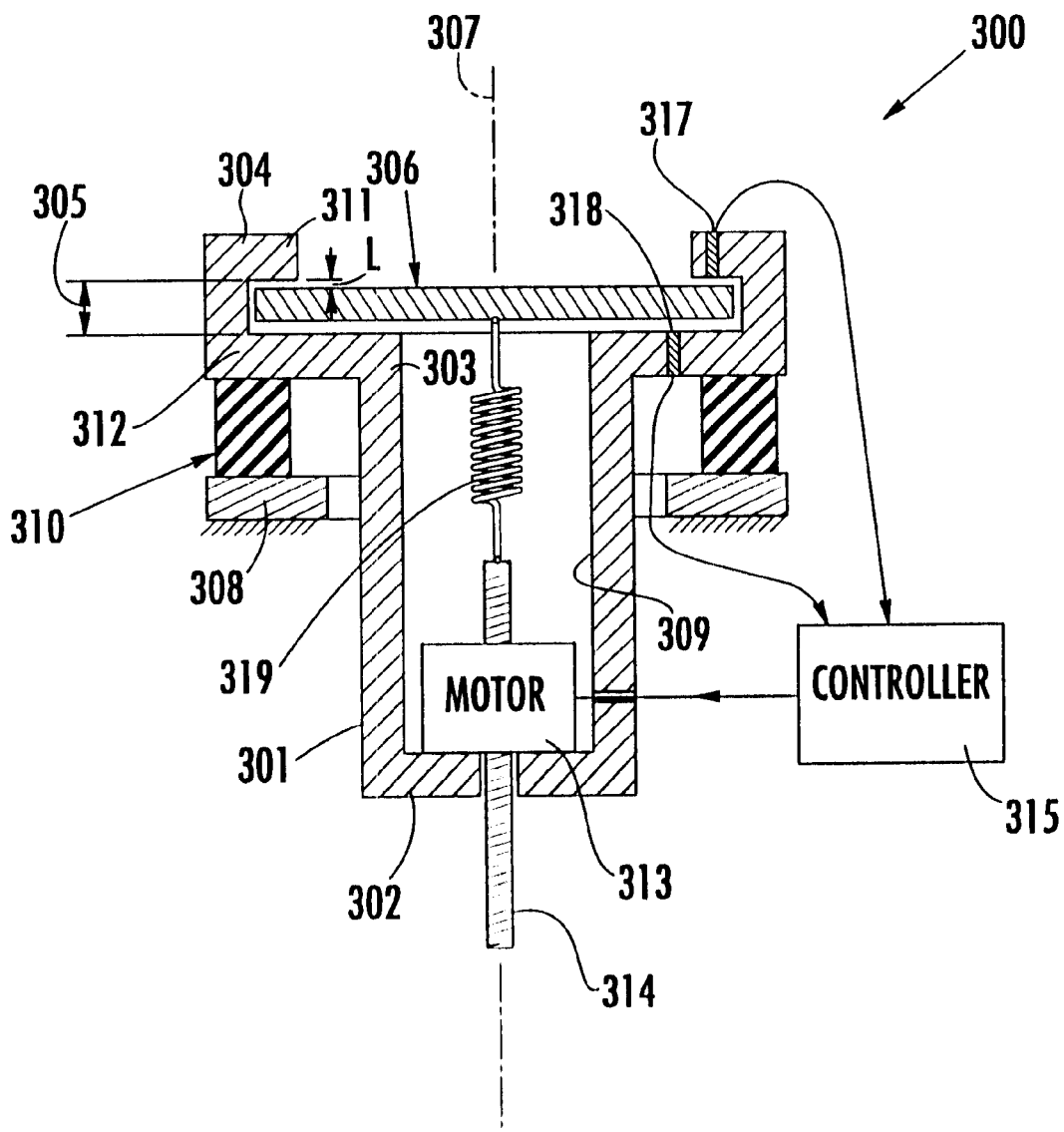
FIG. 15 is a sectional view of a tenth embodiment suspension device of the present invention.

A tenth preferred embodiment of the controlled equilibrium device of the present invention 300 is illustrated in FIG. 15. The mount comprises a unitary housing 301 which defines chamber 309 and includes substantially closed end 302 and an open end 303 that is surrounded by a c-shaped retaining member 304 that defines a rattle space 305. The retaining member includes upper and lower stops 311 and 312.

Rigid metal plate member 306 is located in the rattle space 305 and is displaceable in the space along axis 307. As centered within the rattle space, the plate is separated from the upper and lower retaining member limits by a distance identified as "L" in FIG. 15. In the tenth preferred embodiment of the invention the limit of travel L is also equal to the deadband displacement distance. The plate is adapted to support a portion of a cab 12 or another movable member. Base member 308 is fixed to frame 14. Annular resilient member 310 is bonded to the retaining member and to the base.

Displacement source/actuator for moving plate 306 is a stepper motor or other suitable motor 313 is fixed to the closed housing end 302 within housing chamber 309 and serves to extend and retract screw member 313 as required along axis 307. The screw member is movable through the closed housing end. A coil spring 319 connects the plate and screw and is extended and compressed as the screw is retracted toward end 302 and extended toward end 303. In the mount 300, load leveling by motor is controlled by controller 315 in response to signals received from position sensors 317 and 318.

The motor 313 is electrically connected to controller 314 in signal receiving relation with the controller 315. The controller may be any suitable microprocessor based controller or the like. The controller is in turn electrically connected to position sensors 317 and 318 in signal receiving relation with the sensors. The position sensors are located in the upper and lower limits 311 and 312 of the retaining member and sense if the plate has reached either displacement limit. The sensors measure the position of the plate and the sensors provide feedback information to the controller 315.

Operation of mount 300 will now be described. When large loads are applied to the plate 306 causing the plate to displace axially along axis 307, the plate is displaced through space L until coming in contact with lower stop 312. The conventional position sensor 318 senses the presence of the plate at the stop and sends a signal to the control and the controller sends an actuating signal to motor 313 which causes the motor to extend the screw member 314 toward open end 303 and thereby reduces the load in the spring as the plate is again centered in the rattle space. The motor will be energized until the plate is centered in the rattle space. When the plate experiences upward displacement and is proximate sensor 317, the sensor sends a signal to the controller 315 and the controller sends an actuating signal to the motor that causes the motor to retract the screw inwardly toward end 302. The motor is energized until the plate is relocated away from sensor 317. When the plate is centered in the rattle space, the spring rate will only be that of a soft spring. When the plate bottoms or tops out against either stop limit, the mount stiffness will be larger and is comprised of both the spring rate of the soft spring and the resilient member 310.

Referring to the schematic representation of the CEM of the present invention of FIG. 2, in the tenth preferred embodiment of the invention, integral damping is supplied by the resilient properties of resilient member 310; the first spring Kc is defined as the spring member 319 and the additional spring Kr is provided by resilient member 310. Supplemental spring stiffness may be supplied by locating snubbing members along the interior of the upper and lower stops 311 and 312. The load leveling displacement means is the motor and ballscrew 314. The relative motion is sensed by senor 317 and the controller is electronic controller 315. The controller establishes the speed of response of the load leveling device.

Eleventh Preferred Embodiment of the Invention

Figure 16:
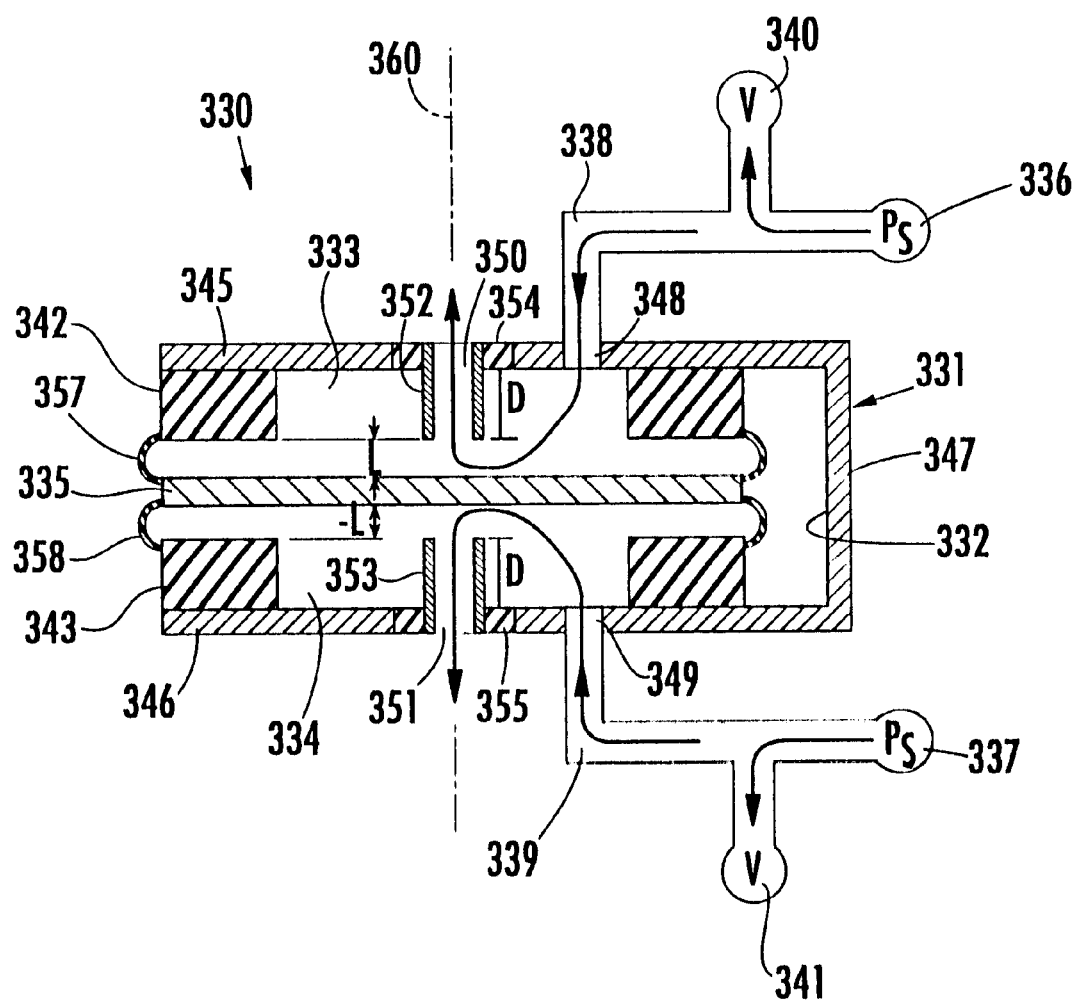
FIG. 16 is a sectional view of an eleventh embodiment suspension device of the present invention.

An eleventh preferred embodiment of the controlled equilibrium device of the present invention is illustrated in FIG. 16. The eleventh preferred embodiment comprises a housing 331 that defines a chamber 332 that is further divided into upper and lower housing chambers 333 and 334 by a movable plate 335 that is movable axially along axis 360. The plate is attached to the suspension 14. The housing comprises first and second limiting plates 345 and 346 joined by intermediate plate 347. Inlet and discharge ports are provided in each limiting plate, and these ports are identified by 348, 349 and 350, 351. A tubular sleeve 352 and 353 with an axial dimension "D" is provided in each discharge port. The sleeves extend into the respective chambers toward plate 335 and are each maintained fixed in respective plate member by a resilient ring member 354 and 355. The distance between the end of each sleeve and the adjacent face of the plate is the sway space in the particular chamber. The sway space or travel limits "L" are equal to the deadband displacements and is also the distance between the free face of the resilient members 342 and 343 and the adjacent plate surface. The resilient members 342 and 343 are made integral with respective housing walls 345 and 346 in a conventional manner. The resilient members are made from a suitable rubber. The resilient members serve as snubbing elements for limiting the displacement of the plate when the plate is displaced to its sway space travel limit.

Dedicated sources of pressurized fluid 336 and 337 are flow connected to the upper and lower chambers respectively. Flow conduits 338 and 339 flow connect the pressure sources 336 and 337 to the respective chamber inlets 348 and 349. In order to maintain a soft spring rate, the pressurized fluid may flow into flow volumes 340 and 341 which are flow connected to conduits 338 and 339. The flow volume may include a conventional valve or other well known device that opens the volumes to the pressurized fluid when the pressure in the housing chambers exceeds a predetermined maximum value.

First and second resilient low stiffness seals 357 and 358 extend between snubbing member 342 and plate 335 and snubbing member 343 and plate 335 and are fixed at their edges to the plate and resilient member. Thus, the first chamber 333 is defined by plate 345, resilient member 342, seal 357 and plate 335. The second chamber 334 is defined by plate 346, resilient member 343, seal 358 and plate 335. As shown in FIG. 16, the first and second chambers are not flow connected.

Operation of eleventh preferred embodiment mount 330 will now be described. The deadband range where the spring rate remains substantially constant is defined as the sway space between "L" and "−L" on FIG. 16. During operation, when a large transient load is applied to the mount causing the plate 335 to be displaced axially toward sleeve 352, the spring rate does not change substantially until the plate 335 reaches the sway space limit and contacts the sleeve 352 and resilient member 342. As a result of such contact the sleeve is closed to the flow of pressurized fluid. The mount spring rate is increased as the plate reaches the sway space limit and contacts the snubbing member 342 and closes the sleeve. The spring rate for the mount increases as the fluid pressure builds in the closed volume 333. As the pressure builds in the chamber the plate 335 is caused to move from the sway space limit and is returned to its level position. As a result, the mount is able to overcome large transient loading. When large loads are applied to the mount to cause the plate to be displaced through sway space −L, the plate bottoms out on snubbing element 343 and closes sleeve 353 and the mount functions in the manner previously described when the plate reaches sway space limit L.

Referring to the schematic representation of the CEM of the present invention of FIG. 2, in the eleventh preferred embodiment of the invention, integral damping is supplied by the resilient seals 357 and 358 and residual damping is supplied by air flow through ports 350 and 351; the first spring Kc is defined as the housing air pressure; the additional spring Kr is provided by snubbing members 342 and 343 and the supplemental spring rate Ks is provided by the resilient members 357 and 358. The load leveling displacement means is the pressure within mount 333 and 334, the relative motion between housing 331 and inner member 335 is the sensor, and the openings 350 and 351 in the housing is the controller.

Twelfth Preferred Embodiment of the Invention

Figure 17:
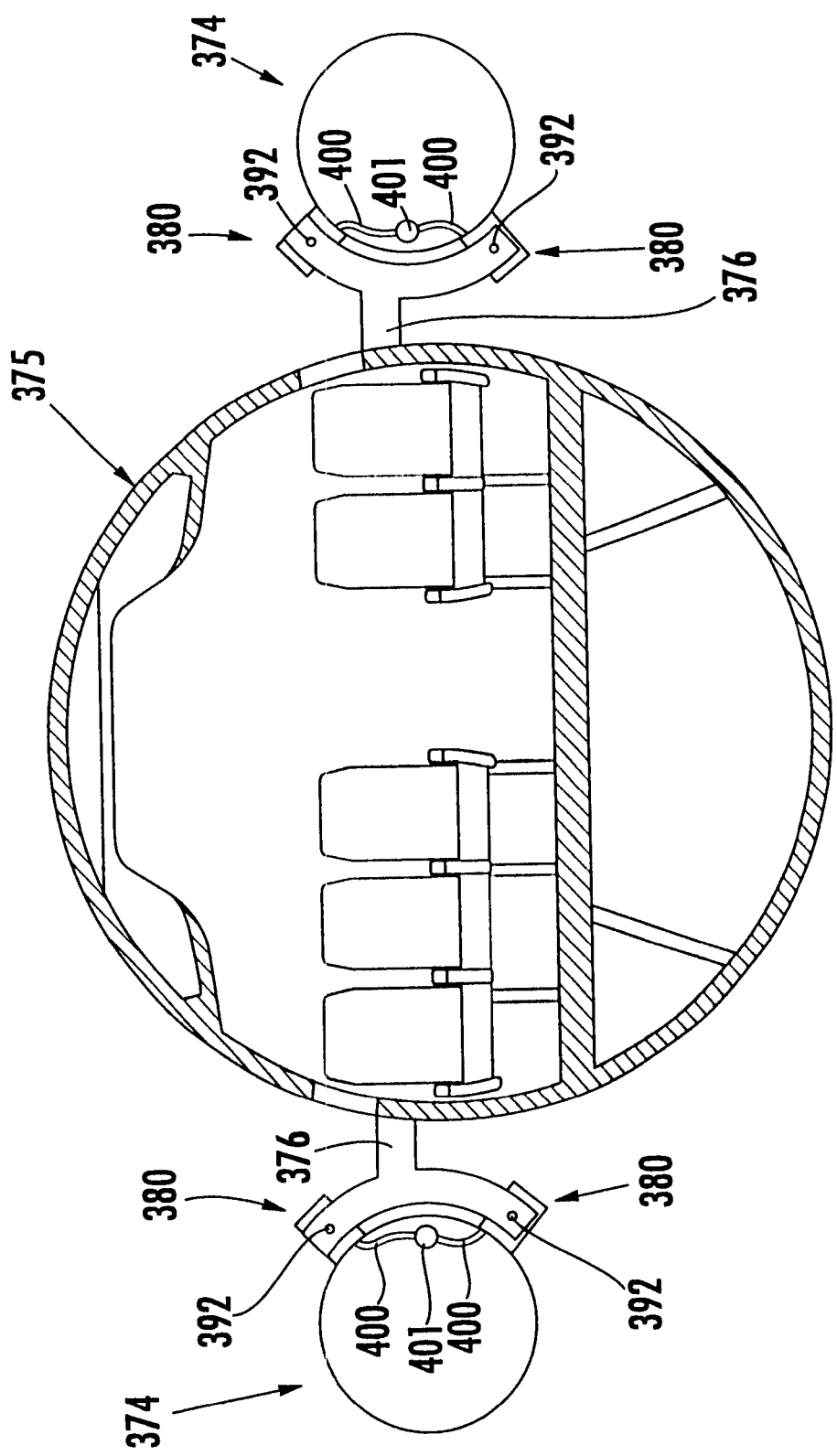
FIG. 17 is a schematic representation of an aircraft that includes the suspension device of the present invention for mounting aircraft engines to the aircraft fuselage.
Figure 18:
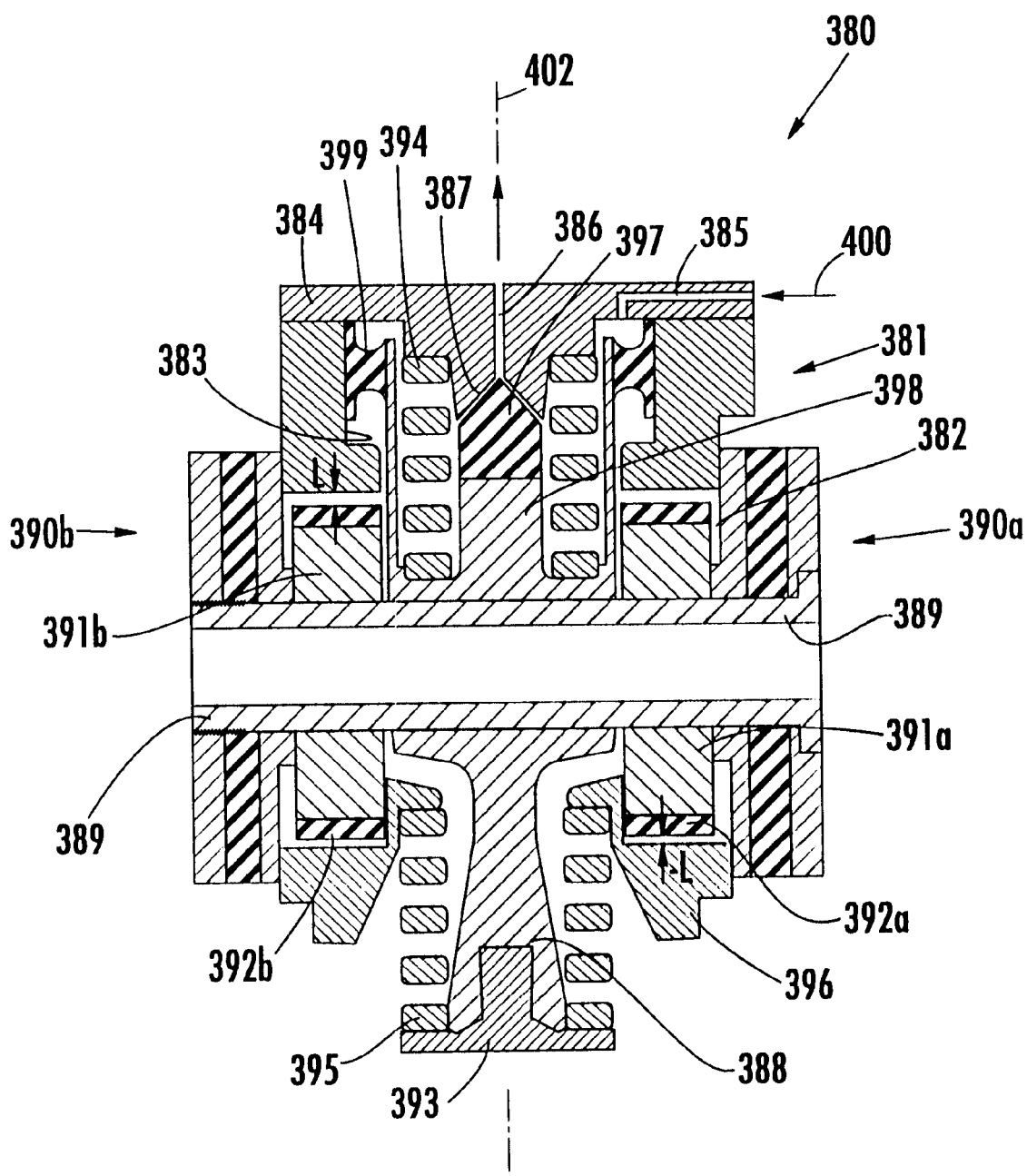
FIG. 18 is a sectional view of a twelfth embodiment suspension device of the present invention.

A twelfth preferred embodiment controlled equilibrium device of the present invention 380 is illustrated in FIG. 18. The twelfth preferred embodiment device is designed to support engines 374 that are mounted to the exterior of fuselage passenger compartment 375 by an aircraft interface such as rigid yoke attachment members 376 for example. The exterior fuselage mounting configuration is illustrated schematically in FIG. 17.

Turning now to FIG. 18, the twelfth embodiment CEM 380 comprises housing 381 that defines laterally oriented chamber 382 and longitudinally oriented chamber 383 and pressure chamber 396. Chamber 383 is sealed by resilient members 403 and 399 and chamber 382 is sealed by resilient members 404 and 399. One end of the housing is closed by movable valve cap 384 that includes supply port 385 and discharge port 386. The cap is seated on the housing end and may be made integral with the housing end in any conventional manner such as by a bolt connection or the like. As shown in FIG. 18, the supply fluid is supplied to and is exhausted from the longitudinally extending pressure chamber 396. As shown in FIG. 18, the discharge port inlet 386 tapers inwardly in the shape of a "V".

Spring support member 388 extends longitudinally through the housing chambers 383 and 396 and is fixed to a hollow tubular shaft member 389 that extends laterally through the housing chambers 382 and 383. Spool member 393 is made integral with the end of spring support member located opposite cap 384. The spool may be threadably connected to the spring support member. As shown in FIG. 18, the mount includes two discrete coil spring members 394 and 395. The springs function in parallel to support static loads applied to the mount. Spring 394 is located between cap 384 and upper portion of support member 388, and spring 395 is located between spool 393 and engine attach bracket 396. The mount is made integral with engines 374 by a conventional bolt attachment 392 that is passed through the engine attach bracket 376 and shaft 389 in a manner well known to one skilled in the relevant art. The shaft and housing 388 remain fixed during operation of mount 380.

An elastomer valve 397 is made integral with upper portion of spring support member hub 388. The valve includes angled free surfaces that are adapted to sealingly engage the discharge port inlet as the cap 384 is displaced axially toward valve 397. The valve is a compressible valve that provides an axial seal against valve surfaces 387. The mount provides an air bleed system that releases air when the cap is separated from the valve by a distance and sealingly engages the compressible member 397 when the cap and associated port 386 is displaced below a threshold limit. The spring rate for the mount is unaffected until the valve substantially closes the port 387. When the port 386 is closed by the valve, the mount spring rate is increased a relatively small amount.

Thrust pad members 390a and 390b are fixed to the shaft ends that extend outwardly from housing 381. The thrust pads connect to the shaft in a conventional manner such as by a threaded connection for example. The thrust pads are located outside of the housing and against the housing. A bolt 392 or other conventional attachment member is passed through the shaft 389 and serves to connect the mount 380 to the attachment means 376. See FIG. 17.

Snubbing members 391a and 391b are also fixed to the shaft 389 inwardly of the thrust pads 390a and 390b and the snubbing members are located in housing chambers 382 and 383. Each snubbing member comprises a metal disc with an annular resilient layer 392a, 392b bonded to the outer peripheral surface of a respective disc. If the load applied to mount 380 is of sufficient magnitude, the elastomeric valve 397 will be compressed by cap 384 until the resilient snubbing layers 392a and 392b make snubbing contact with the housing when the spring support is displaced axially along axis 393 and such displacement exceeds the sway space region with limits "L"and "−L" identified in FIG. 18. The travel limits are defined by the sway space limits. As shown in FIG. 18, the desired spacing between thrust pads 390a and 390b and adjacent snubbing members 392a and 392b is maintained by annular metal sleeve members 398a and 398b.

Elastomeric member 399 joins the spring support member 388 and the housing 381 along the longitudinal chambers 383, 382. The elastomeric members provide resistance to axial and shear loading applied to mount 380. The elastomeric members may be any suitable rubber element bonded to the support member and housing using a conventional adhesive.

Bleed fluid supply is supplied from the engine to the mount port 385 by supply line 400. The fluid is bled or supplied from the engine 374 and as required to be fed to the required mount(s) through conventional valving 401. The valving is flow connected to the supply lines to ensure the required volume of fluid is supplied to the mount. The supply lines and valving many be any suitable system well known to one skilled in the art.

Operation of the twelfth embodiment CEM will now be described. During typically experienced high frequency, low amplitude loads pressurized fluid is supplied through port 385 to housing chamber 396 and is exhausted out port 386. In this way, the combination of the spring forces and air pressure in chamber 396 cause the load and mount to be maintained substantially in the nominal orientation shown in FIG. 18 during periods of typical loading.

When a large magnitude low frequency load is applied to the mount causing the cap and springs to compress valve 397 as the cap contacts the valve member. A large load may cause the valve 397 to close the discharge port as the valve sealingly engages the discharge port. By sealing the discharge port the pressure in chamber 396 increases until the cap is unseated from the valve as the cap is urged away from the valve 397. The pressure in the housing increases the mount spring rate a small amount relative to the spring rate when the valve 397 is open. If the load causes the mount to extend and the cap is displaced downward, support 388, the discharge port is opened a greater amount to permit a larger volume of fluid to be bled from the chamber 396. Once the pressure in the chamber has been reduced, the combination of the load and revised pneumatic spring force enables the mount to return to the nominal position shown in FIG. 18.

Referring to the schematic representation of the CEM of the present invention of FIG. 2, in the twelfth preferred embodiment of the invention, integral damping is supplied by the resilient members 399, 403 and 404; the first spring Kc is defined as the hydraulic fluid; the additional spring Kr is provided by snubbing members 392a, and 392b and the supplemental spring rate Ks is provided by members 394, 395, 399, 403 and 404. The fluid pressure in the mount is the load leveling displacement means, the relative displacement between the housing 384 and inner member 389 is the sensor and the openings 385, 386 is the controller with the response speed of the device being dictated by the sizes of the openings.

Thirteenth Preferred Embodiment of the Invention

Figure 19:
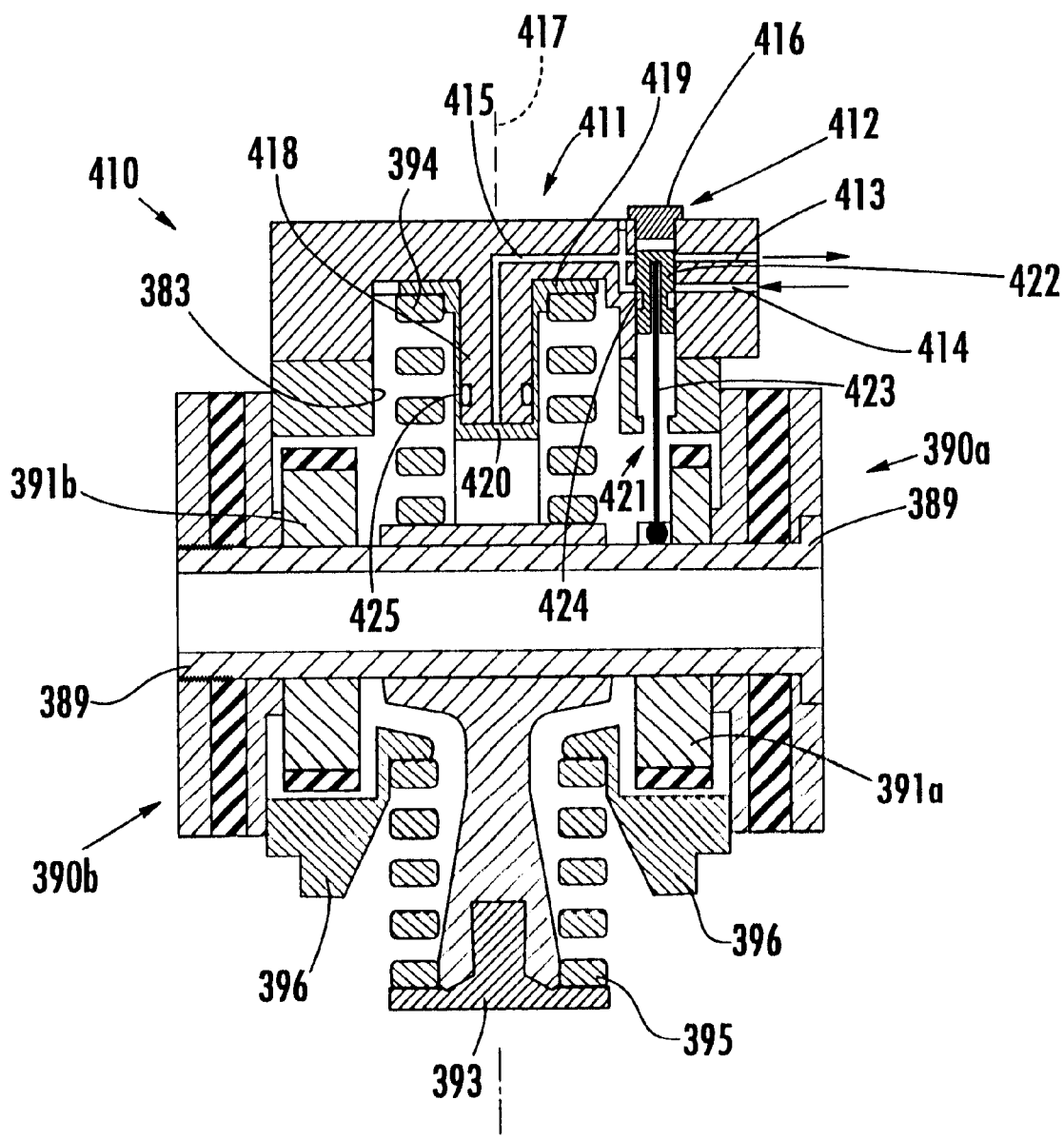
FIG. 19 is a sectional view of a thirteenth embodiment suspension device of the present invention.

A thirteenth preferred embodiment mount of the present invention 410 is shown in FIG. 19. The thirteenth embodiment mount comprises many of the elements of the twelfth embodiment mount including housing 381, support 388, springs 394 and 395, snubbing members 391a and 391b, thrust pads 390a and 390b, shaft 389 and spool 393. The fluid used to actuate the thirteenth embodiment mount 410 is hydraulic fluid and the cap 411 and valve 412 are suitable for use with hydraulic fluid. The thirteenth embodiment mount of the present invention is attached to yoke 376 and engine 374 in the manner previously described in conjunction with the twelfth embodiment mount 380.

Cap 411 is fixed to the housing along the top of the housing and includes discharge and inlet ports 413 and 414 which are flow connected to main flow line 415 that communicates with chamber 383a through axially oriented cap hub 418. The hub is inserted in sleeve member 419 that is slidable axially relative to hub 418 as the pressure in line 415 changes during changes in the loads applied to mount 410. As shown in FIG. 19, the sleeve has a closed end 420 located proximate the discharge end of main line 415. Additionally, the cap includes spool valve access cap 416 to provide for mount assembly. The cap includes a small port (not shown) for relieving fluid pressure in the valve 421.

Valve 421 is slidable through housing 381 and cap 411 and includes a spool member 422 made integral with link 423 which in turn is connected to shaft 389 to be movable with the shaft. The spool includes an annular groove 424 which when aligned with inlet port 414 flow connects the supply of hydraulic fluid (not shown) with the main line 415. The discharge port 413 remains closed until the housing 396 and cap 411 move downward and the discharge port is not obstructed by the spool. The spool is not displaced during mount loading. The cap and housing 381 move relative to the spool. The deadband range for mount 410 whereby the spring adjustment force for the mount is not substantially changed is relatively small. The deadband distance is the axial distance between the edges of ports 413 and 414 minus the width of the spool groove 424. The mount 41 is shown in the nominal position in FIG. 19 with the groove 424 located between the ports 414 and 413. The requisite fluid seal 425 is provided between sleeve 419 and hub 418 to prevent fluid collected between the hub and closed sleeve end from leaking into chamber 383.

Operation of the thirteenth embodiment controlled equilibrium device will now be described. When typical high frequency, low magnitude loads are applied to mount 410, the mount is maintained in the position shown in FIG. 19. When a large transient load tending to compress the mount is applied to member 388, the valve moves the spool groove 424 into alignment with inlet port 414 causing hydraulic fluid to be supplied to main line 415. The hydraulic fluid urges the sleeve axially away from the hub 418. As the sleeve is translated the top spring 394 is compressed causing the mount to extend back to its nominal position. As the mount is extended the groove 424 is moved out of alignment with port 414 and the flow of fluid to line 415 is terminated. The sleeve remains displaced from the hub.

When the mount is extended, the spool moves relatively downward, thereby opening the discharge port to discharge fluid out of line 415 and from between the sleeve 419 and hub 418. The compression of the top spring is decreased causing the mount to return to its nominal position. The fluid continues to be discharged until the spool again moves axially and closes the discharge port.

Referring to the schematic representation of the CEM of the present invention of FIG. 2, in the thirteenth preferred embodiment of the invention, integral damping is provided by resilient members 403 and 404e; the first spring Kc is defined as the housing air pressure; the additional spring Kr is provided by snubbing members 391a and 391b and the supplemental spring rate Ks is provided by the elastomeric springs 403 and 404. The displacement means of the load leveling device is the fluid pressure in the mount; the relative displacement between the housing and inner member 389 is the sensor, and the controller is represented by the openings 413 and 414 in the housing.

Fourteenth Preferred Embodiment of the Invention

Figure 20:
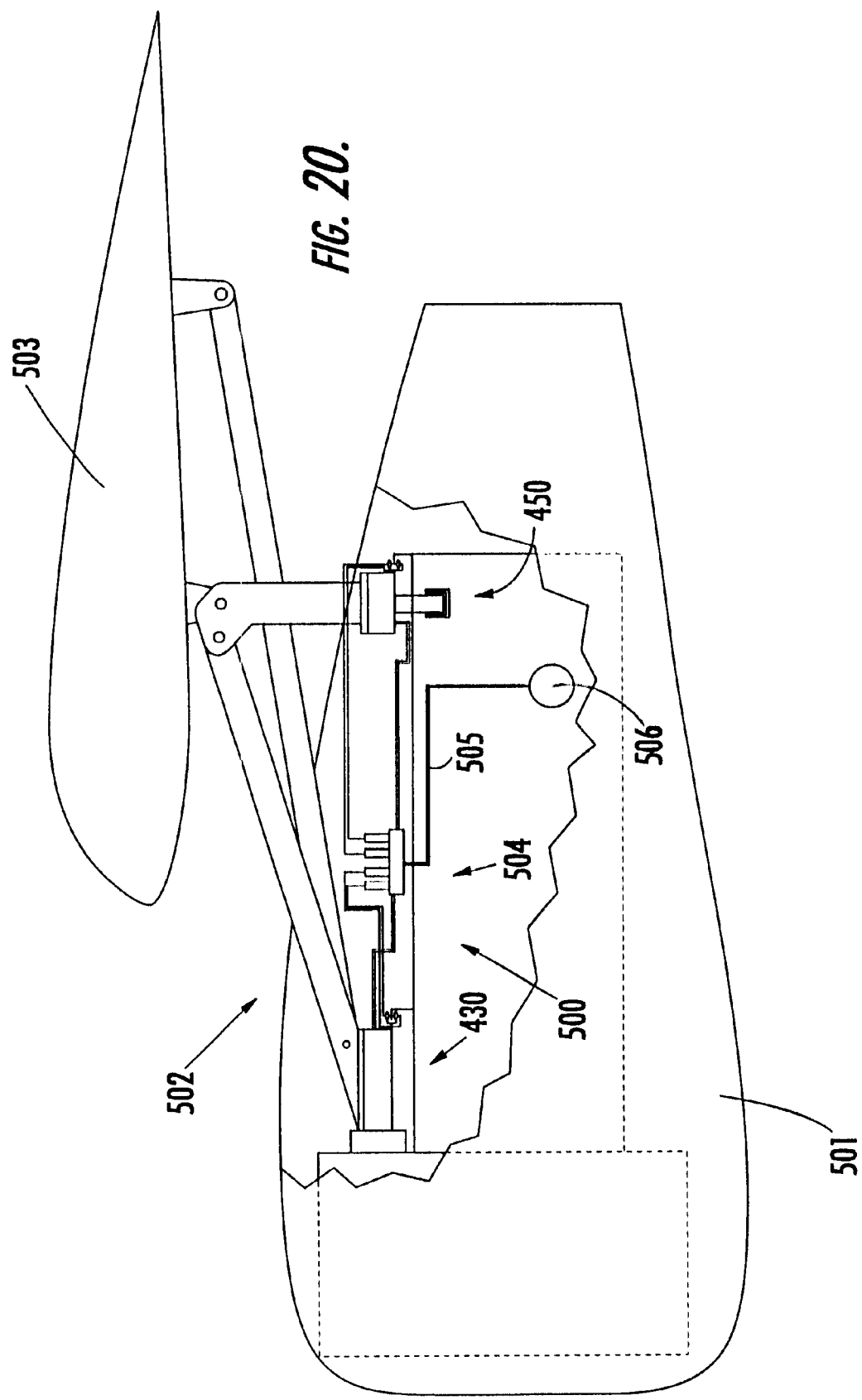
FIG. 20 is a schematic representation of an aircraft engine mounted to an aircraft wing by a mounting system that includes fourteenth and fifteenth embodiment suspension devices of the present invention as components of the mounting system.
Figure 21:
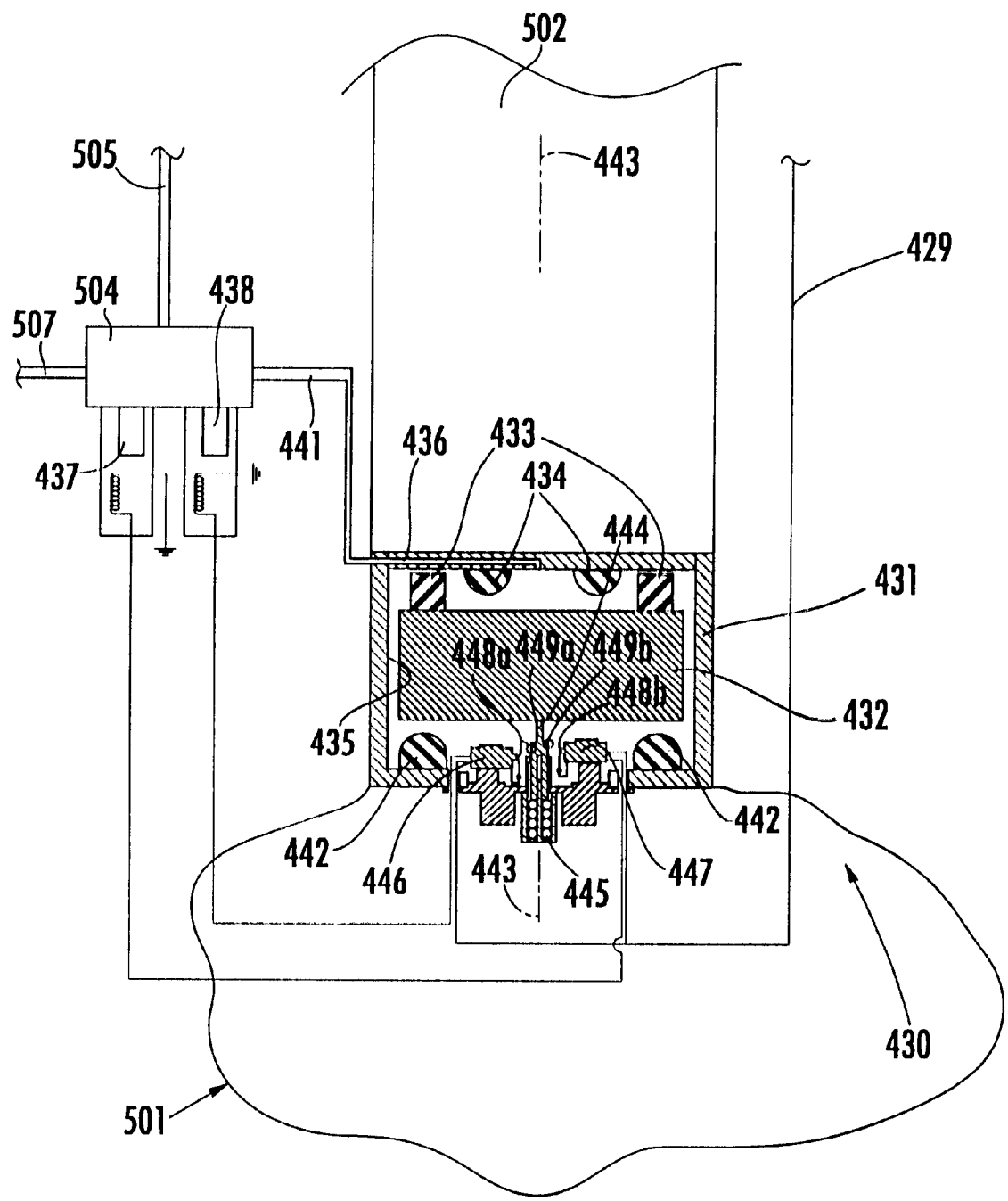
FIG. 21 is schematic representation of the front aircraft engine suspension device for the system of FIG. 20.

The fourteenth preferred embodiment of the present invention 430 is illustrated schematically in FIG. 21. FIG. 20 schematically illustrates a system 500 for mounting an aircraft engine 501 to the underside of an aircraft wing 503 supported by a pylon structure 502. The engine 501, wing 503 and pylon structure 502 are of conventional design, well known to one skilled in the relevant art and therefore further detailed description of these components except as required to describe the environment and functionality of mount system 500, is not required.

Generally engine mount system 500 comprises fourteenth embodiment CEM of the present invention 430 supporting the front of the engine 501, fifteenth embodiment CEM of the present invention 450 supporting the rear portion of the engine 501 and a fluid control system 504 connected to both mounts 430 and 450 to control the flow of fluid to the mounts 430 and 450. The pylon structure 502 is made integral with both mounts 430 and 450 in a conventional manner and the mounts are in turn conventionally made integral with the engine 501. During use, the mounts 430 and 450 support the engine, react to engine thrust, and react to engine G loads from aircraft maneuvers and gust loading.

Figure 23:
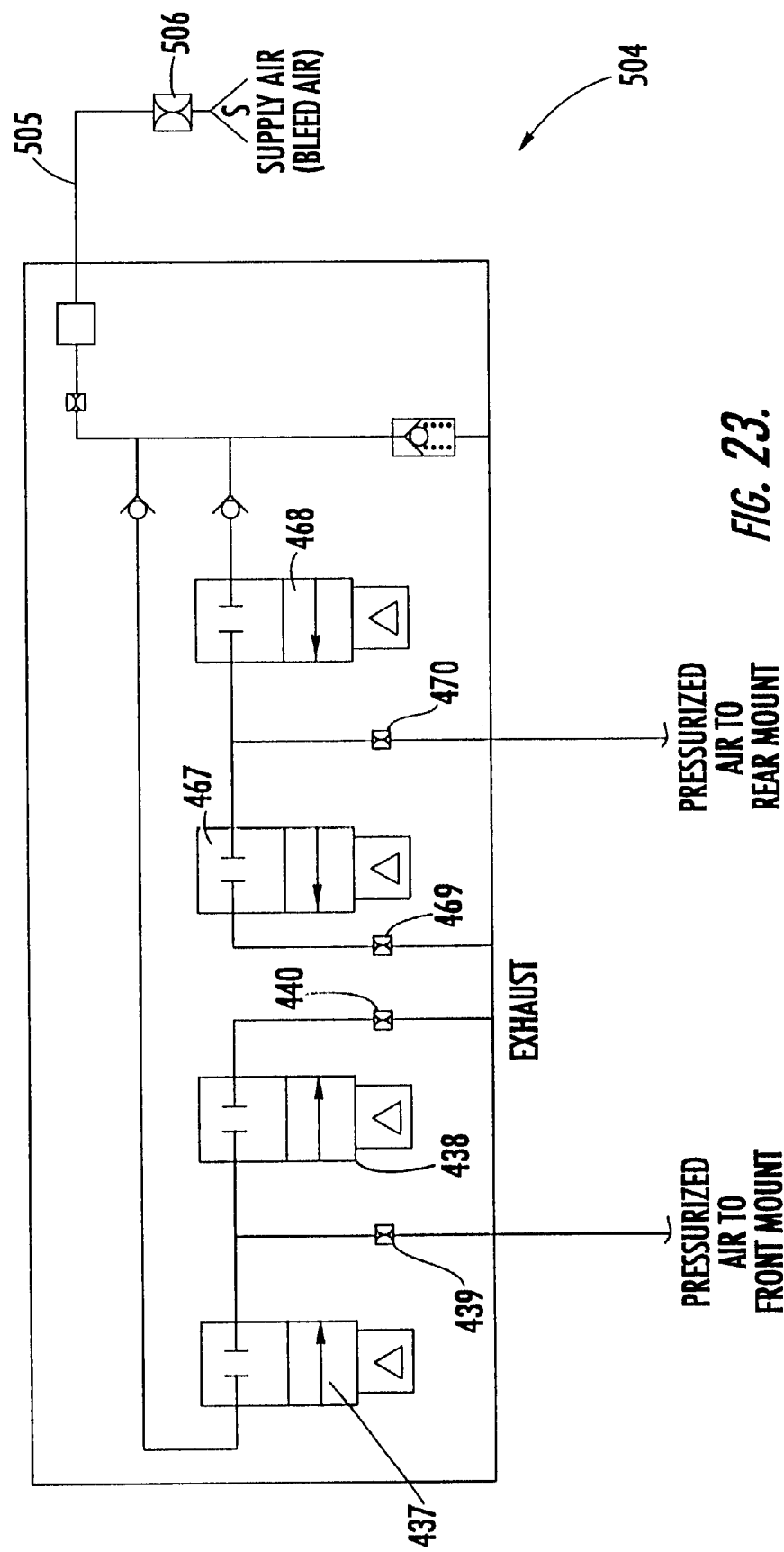
FIG. 23 is a pneumatic circuit diagram for controlling and directing the supply of fluid to the devices of the system of FIG. 20.

The fourteenth embodiment of the controlled equilibrium mount of the present invention will now be described. The fourteenth embodiment CEM 430 is shown in cross section in FIG. 21 and includes a rigid housing 431 that defines a housing chamber 435 with an inner member 432 movably suspended in the housing chamber by elastomeric members 433 that are made integral with the housing and the inner member. The housing includes a port 436 for flowing a fluid such as air into and out of a pressure chamber 602 as required to maintain the mount at the desired level and to support the engine 501 during periods of typical high frequency small loads as well as during the application of low frequency large loads. The chamber 602 is defined by the inner member 432, the elastomeric member 433 and housing 431. Turning to FIG. 23, the port 436 is flow connected to valve system 504 by a conventional conduit 441. The flow control system 504 includes inlet solenoid valve 437 and exhaust solenoid valve 438 that serve to allow the flow of a pressurized fluid into and out of the chamber 602. Main pressurized fluid supply line 505 is flow connected to a pressurized fluid source from the engine 501 that is flow restricted using restrictor 506. Downstream of the main fluid supply line 505 is a conventional flow restriction 550 and filtration screen 551. Flow check valves 552 and 553 are flow connected to inlet and discharge lines and the valves 552 and 553 prevent backflow of the pressurized fluid to the system. Pressure relief valve 554 is flow connected to the supply line to the front mounts and serves to prevent supplying excessively high-pressure fluid to the mount, which may damage the mount. Restrictors 439 and 440 are selected such that the time to fill/exhaust chamber 435 is long such that the system is stable. Because the fluid control is a simple analog on/off system the potential for instability exists. By incorporating restrictors 439 and 440 into controller 504, the more stable fluid flow into and out of the mount is ensured. Restrictors 439 and 440 are selected taking into account both the volume in chamber 602 and the volume of fluid in conduit 441.

Returning to FIG. 21, resilient snubbing members 434 and 442 are made integral with opposed axially spaced sides of the housing 431 in the housing chamber 435, and the resilient members serve to snub the motion of inner member 432 along axis 443 during periods of large amplitude loads. The snubbing members may have semisphereical or semicylindrical contact portions.

A spring loaded contact pin 444 is movable axially by spring member 445 so that at substantially all times the free pin end is in contact with the inner member 432. Movement of the inner member along axis 443 causes the pin to extend and retract axially.

Switch members 446 and 447 are fixed to the housing 431. The switches are conventional contact switches well known to one skilled in the art. Both switches are powered by the aircraft power supply (typically about 28 volts) through power line 429. Each switch 446 and 447 includes a lever arm 448a and 448b with an attached roller 449a and 449b that are in contact with pin member 444. The rollers are located at different locations along the axial length of pin 444. In this way, when the mount is at its level position, both switch members 446 and 447 are open and therefore the inlet solenoid valve 437 and exhaust solenoid valve 438 are closed and no fluid flow neither filling or exhausting occurs. When the inner member 432 is displaced toward port 436 a sufficient distance, roller 449a is displaced laterally such that the lever arm 448a is displaced to close switch 446 which energizes inlet solenoid valve 437 opening the valve which permits pressurized fluid to be supplied to the chamber 602 from supply conduit 441 causing the pressure in the chamber to increase causing the inner member to move away from the port 436. When the pin retracts and the switch 446 is opened, the solenoid is de-energized causing the valve to close to the supply fluid. When the inner member is moved downward a sufficient distance, roller 449b is displaced laterally such that the lever arm 448b is displaced to close switch 447 which energizes exhaust solenoid valve 438 opening the valve which permits pressurized fluid to be exhausted from chamber 602 through exhaust conduit 507 causing the pressure in the chamber to decrease causing the inner member to move upward towards port 436. When the pin extends and switch 447 is opened, the exhaust solenoid valve 438 is de-energized causing the valve to close which prevents exhausting of the chamber 602. The solenoid valves are never energized concurrently.

Referring to the schematic representation of the CEM of the present invention of FIG. 2, in the fourteenth preferred embodiment of the invention, integral damping is provided by resilient member 433; the first spring Kc is defined as the stiffness of the fluid in the mount; the additional spring Kr is provided by snubbing members 434 and 442 and the supplemental spring rate Ks is provided by the elastomeric member 433. The displacement means of the load leveling device is the fluid pressure in the mount; the relative displacement between the housing 435 and inner member 432 is the sensor, and the two contact switches and solenoids that flow fluid in and out of the mount is the controller. The size of the restrictions in manifold 504 define the speed of response of the system.

Fifteenth Preferred Embodiment of the Invention

The fifteenth preferred embodiment of the present invention 450 illustrated in FIG. 22 will now be described. The rear engine control equilibrium mount 450 is located between the pylon 502 and the engine 501 and is flow connected to the fluid control system 504 by conduit 601 through port 603.

Figure 22:
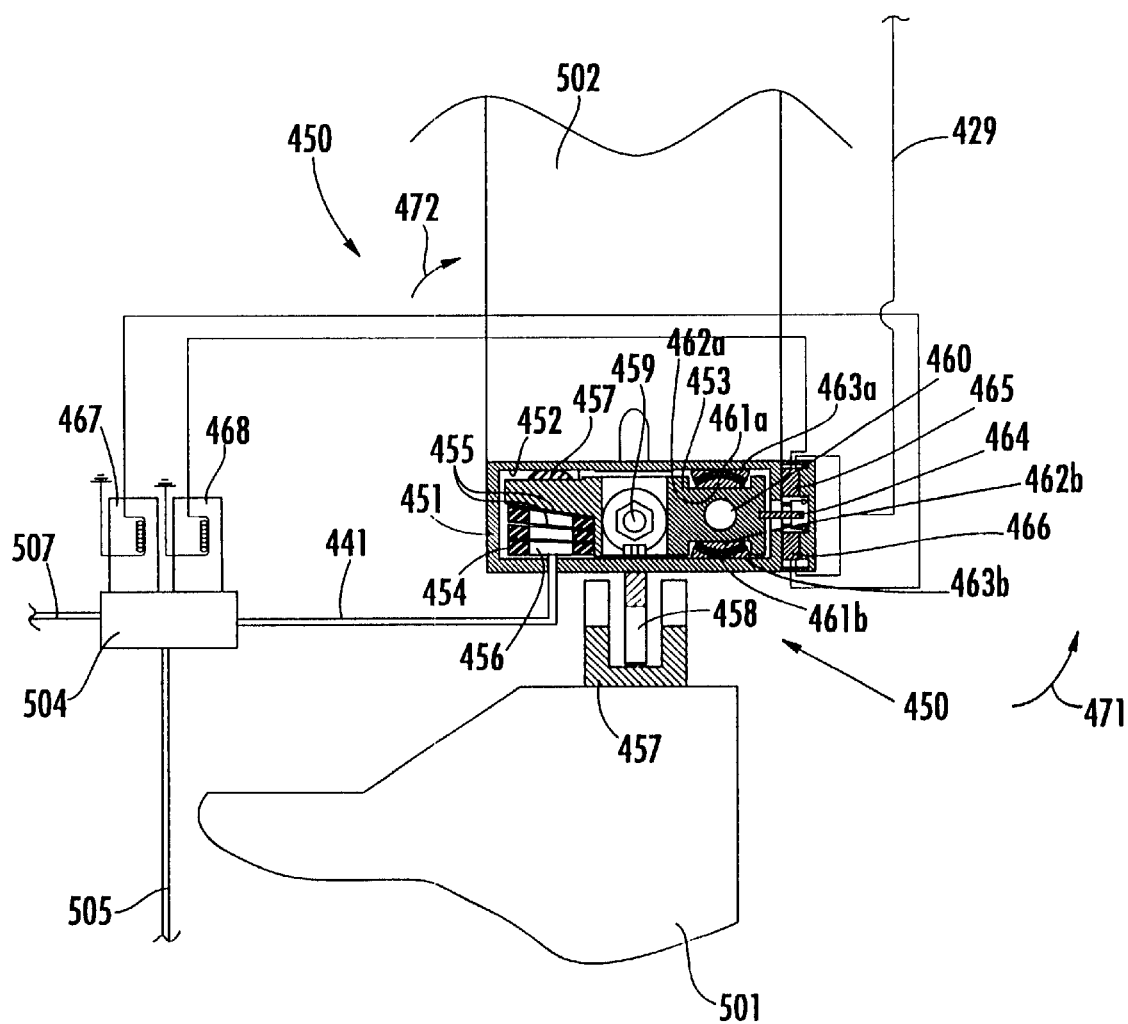
FIG. 22 is schematic representation of the aft aircraft engine suspension device for the system of FIG. 20.

The mount 450 is shown in cross section in FIG. 22 and comprises a housing 451 that defines a housing chamber 452. A torque tube 453 is located in the housing chamber and includes resilient mount members at the torque tube ends. As shown in FIG. 22, one end of torque tube 453 is supported by a plurality alternating layers comprised of resilient elements 454 and metal shim members 455. The resilient elements and shims have annular configurations which when stacked in the manner shown in FIG. 22 define a hollow chamber 456. The housing 451 includes a port 603 for flowing a fluid such as air into and out of chamber 456 as required to maintain the mount at the desired level and to support the engine 501 during periods of typical high frequency small magnitude loads as well as during the application of low frequency large magnitude loads.

Returning now to FIG. 23, port 603 is flow connected to fluid control system 504 by a conventional conduit 601. The fluid control system 504 includes solenoid valve 468 and exhaust solenoid valve 467 and serves to allow the flow of pressurized fluid into and out of chamber 456. Main flow line 505 is flow connected to a pressurized fluid source from the engine 501 that is flow restricted by restrictor 506. Downstream of the main supply line 505 is a conventional flow restriction 550 and filtration screen 551. Flow check valves 552 and 553 are flow connected to inlet and discharge lines and the valves 552 and 553 prevent backflow of the pressurized fluid to the system. Pressure relief valve 555 is flow connected to the supply line to the rear mount and serves to prevent supplying excessively high pressure fluid to the mount, which may damage the mount. Restrictors 469 and 470 are selected to ensure system stability as previously described.

Returning now to FIG. 22, during operation of mount 450, the fluid pressure in chamber 456 is varied as required to maintain the mount in the desired orientation. A semispherical snubbing element 457 is located at the end of block. The member 457 serves to eliminate undesirable metal-to-metal contact between the member 453 and housing 451.

A U-shaped bracket member 604 is fixed to the engine 501 with the open portion of the bracket directed towards mount 450. A link member 458 is made integral to the torque tube 453 and the bracket 604 through bearings such that when the engine is displaced downward, the torque tube is displaced downward but is free to rotate.

The application of a vertical load to the link member 458 will lead a motion of the torque tube 453 that is predominately rotation about the centerline of hole 460. The motion is predominately rotation because of the cylindrical layers of resilient layers and metal shims located on both sides of the centerline of hole 460. The axis of the cylindrical layers is coincident with the centerline of hole 460. The alternating cylindrical layers of resilient layers and metal shims are referred to generally at 461a and 461b in FIG. 22. The members 461a and 461b are sandwiched between cylindrical hubs 462a and 462b fixed to the torque tube and cylindrical shrouds 463a and 463b made integral with the interior of the housing.

The switch lever 464 is made integral with the end of torque tube 453 near the centerline of hole 460 and serves to actuate switches 465 and 466 as required to actuate inlet solenoid valve 468 and exhaust solenoid valve 467 of system 504. The switches 465 and 466 are similar to switches 446 and 447 described with the fourteenth preferred embodiment mount 430, and the switches include rollers that are made integral with the lever arm of the switch. The rollers are positioned relative to the switch lever 464 such that the switches will be closed for specific amounts of clockwise or counter-clockwise rotation of the torque tube 453 about the centerline of hole 460. Both switches are powered by the aircraft power supply (typically about 28 volts) through power line 429.

Operation of mount 450 will now be described. When a downward vertical load is applied to mount 450 causing the torque tube 453 to rotate about hole centerline 460 in counterclockwise direction 471, the members 454 and 455 compress as the torque tube end opposite hole 460 moves toward port 603. The switch lever 464 is also displaced and such displacement causes switch 465 to close, energizing inlet solenoid valve 468 and opening the valve to permit pressurized fluid to be supplied to chamber 456 from conduit 601. As the pressure in the chamber increases the torque tube is displaced away from port 603 and the fluid is supplied to the chamber until switch 465 opens thereby de-energizing inlet solenoid valve 468 and thus close the supply of pressurized fluid. When the downward vertical load applied to mount 450 is reduced causing the torque tube 453 to rotate about hole centerline 460 in the clockwise direction 472, the members 454 and 455 extend as the torque tube end opposite hole 460 moves away from port 603. The switch lever 464 is also displaced and such displacement causes switch 466 to close, energizing exhaust solenoid valve 467 and opening the valve to permit exhausting of chamber 456 through exhaust conduit 605. As the pressure in the chamber decreases the torque tube is displaced towards port 604 and the fluid is exhausted until switch 466 opens thereby de-energizing exhaust solenoid valve 467. The solenoid valves are never energized concurrently. Over rotation of mount 450 is prevented by the snubbing member 457. For both mounts 430 and 450, 0.01–0.02 inches of displacement of inner member 432 or torque tube 453 will cause either the exhaust or inlet switches to be closed depending on the direction of displacement of the inner member or torque tube. The mounts typically do not experience displacements that are greater than 0.125 inch.

Referring to the schematic representation of the CEM of the present invention of FIG. 2, in the fifteenth preferred embodiment of the invention, integral damping is provided by resilient member 454; the first spring Kc is defined as the stiffness of the fluid in the mount; the additional spring Kr is not shown and the supplemental spring rate Ks is provided by the elastomeric member 454. The displacement means of the load leveling device is the fluid pressure in the mount; the relative displacement between the housing 451 and aircraft 457 is the sensor, and the two contact switches and solenoids that flow fluid in and out of the mount is the controller. The size of the restrictions in manifold 504 define the speed of response of the system.

All of the preferred embodiments of the present invention comprise a deadband range that helps to minimize fluid use by the mount. Fluid such as air or hydraulic fluid is only supplied to the mount when the load leveling device travels outside the deadband range. The mount load leveling members, ports and chambers are sized so that fluid can only be either supplied or exhausted from the mount when the deadband range is exceeded. The first and second deadband range limits may be the same absolute value or may be different absolute values. Although in the preferred embodiments of the invention the mount is shown centered between the deadband limits and within the housing, the equilibrium location may be any location within the housing. The mount of the present invention is able to effectively maintain load stability and level during low and high frequency disturbances.

While we have illustrated and described a preferred embodiment of our invention, it is understood that this is capable of modification and therefore we do not wish to be limited to the precise details set forth, but desire to avail ourselves of such changes and alterations as fall within the purview of the following claims.

We claim:

1. A suspension device, comprising:

a housing comprising a wall that defines a housing chamber, a hollow resilient surface effect damping sleeve positioned in said housing chamber against said housing wall, said hollow resilient surface effect damping sleeve having a displacement fluid inlet port for inletting a displacement fluid into said housing chamber and a displacement fluid discharge port for discharging said displacement fluid out of said housing chamber;

at least one spring, each at least one spring having a spring stiffness; and a load leveling device supported by one of at least one spring, the load leveling device comprising a piston movable along an axis in said housing chamber, said piston in movable surface effect damping engagement contact with said hollow resilient surface effect damping sleeve, said piston having a first deadband displacement zone end, said piston first deadband displacement zone end movably sealing said hollow resilient surface effect damping sleeve displacement fluid inlet port, said piston having a second deadband displacement zone end, said piston second deadband displacement zone end movable sealing said hollow resilient surface effect damping sleeve displacement fluid discharge port wherein said hollow resilient surface effect damping sleeve provides surface effect damping of a movement of said piston in said chamber, and a movement of said piston first deadband displacement zone end from said hollow resilient sleeve displacement fluid inlet port unseals said inlet port and inlets said displacement fluid into said housing chamber and a movement of said piston second deadband displacement zone end from said hollow resilient sleeve displacement fluid discharge port unseals said discharge port and discharges said displacement fluid out of said housing chamber.

2. The suspension device as claimed in claim 1 wherein said piston having a piston surface with a plurality of protuberances.

3. The suspension device as claimed in claim 2 wherein the piston includes at least three protuberances.

4. The device as claimed in claim 2 wherein the piston comprises five protuberances.

5. The suspension device as claimed in claim 1 wherein the hollow resilient surface effect damping sleeve comprises a thickness in the range of 0.0625–0.25 inch.

6. The suspension device as claimed in claim 1 wherein said displacement fluid is a compressed fluid.

7. The suspension device as claimed in claim 6 wherein the compressed fluid is a compressed air.

8. The suspension device as claimed in claim 1 wherein said displacement fluid is a hydraulic fluid.

9. The suspension device as claimed in claim 1 wherein the piston includes a protuberance proximate said first end and a protuberance proximate said second end.

10. The suspension device as claimed in claim 1 wherein the suspension device comprises a second chamber having a variable volume defined by an expandable and collapsible member, said second chamber being flow connected to the first housing chamber and being expandable and collapsible by said displacement fluid.

11. A suspension device, comprising:

a housing comprising a wall that defines a housing chamber, the housing wall comprising a surface effect damping resilient layer having a displacement fluid inlet port for inletting a displacement fluid into said housing chamber and a displacement fluid discharge port for discharging said displacement fluid out of said housing chamber; and a load leveling piston a member movable through the housing chamber, said piston having surface effect damping contact with said housing wall surface effect damping resilient layer, the load leveling piston member comprising a first deadband displacement zone proximate said surface effect damping resilient layer displacement fluid inlet port and a second deadband displacement zone proximate said surface effect damping resilient layer displacement fluid discharge port, the movable load leveling piston member being at a nominal position when the movable load leveling piston member has a displacement within said first deadband displacement zone and said second deadband displacement zone wherein a load leveling piston member displacement of said first deadband displacement zone away from said surface effect damping resilient layer displacement fluid inlet port unseals said inlet port and inlets said displacement fluid into said housing chamber and a load leveling piston member displacement of said second deadband displacement zone away from said surface effect damping resilient layer displacement fluid discharge port unseals said discharge port and discharges said displacement fluid from said housing chamber.

12. The suspension device as claimed in claim 11 wherein the displacement fluid is a hydraulic fluid.

13. The suspension device as claimed in claim 11 wherein displacement fluid is a compressed air.

14. A suspension device comprising:

a housing comprising a wall that defines a housing chamber, the housing wall comprising a resilient layer having a displacement fluid inlet port for inletting a displacement fluid into said housing chamber and a displacement fluid discharge port for discharging said displacement fluid out of said housing chamber;

a movable piston member movable relative to the housing wall resilient layer displacement fluid inlet port and the housing wall resilient layer displacement fluid discharge port, the movable piston member having a nominal position within said housing chamber under normal loading conditions;

a first spring having a first stiffness operatively isolating said movable piston member under said normal loading conditions;

a displacement means for moving the movable piston member to the nominal position when the movable piston member is subjected to loading outside the normal loading conditions and the movable piston member displacement exceeds a deadband displacement zone.

15. The suspension device as claimed in claim 14 wherein the first spring is a resilient member, the housing, the first spring and the movable piston member define a pressure chamber.

16. The suspension device as claimed in claim 15 wherein the movable piston member is movable linearly within the chamber.

17. The suspension device as claimed in claim 14 wherein the first spring is comprised of a resilient member, the movable piston member being resiliently suspended within the housing by the resilient member.

* * * * *